US008648773B2

(12) United States Patent
Yoshida et al.

(10) Patent No.: US 8,648,773 B2
(45) Date of Patent: Feb. 11, 2014

(54) THREE-DIMENSIONAL DISPLAY

(75) Inventors: Shunsuke Yoshida, Koganei (JP); Sumio Yano, Koganei (JP); Hiroshi Ando, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 165 days.

(21) Appl. No.: 13/391,693

(22) PCT Filed: Aug. 25, 2010

(86) PCT No.: PCT/JP2010/005245
§ 371 (c)(1),
(2), (4) Date: Feb. 22, 2012

(87) PCT Pub. No.: WO2011/024453
PCT Pub. Date: Mar. 3, 2011

(65) Prior Publication Data
US 2012/0146897 A1    Jun. 14, 2012

(30) Foreign Application Priority Data

Aug. 28, 2009    (JP) .................................. 2009-198470

(51) Int. Cl.
*G09G 3/00*    (2006.01)

(52) U.S. Cl.
USPC ................... 345/32; 345/690; 353/7; 353/10; 359/458; 359/478

(58) Field of Classification Search
USPC ........ 345/32, 156, 419, 690, 6, 87; 353/7, 10; 359/22–35, 462–477
See application file for complete search history.

(56) References Cited

U.S. PATENT DOCUMENTS 5,589,957 A * 12/1996 Aritake et al. ................... 359/23
6,421,174 B1 * 7/2002 Ooshima et al. ............. 359/457

(Continued)

FOREIGN PATENT DOCUMENTS

JP    2003-015081 A    1/2003
JP    2005-114771 A    4/2005

(Continued)

OTHER PUBLICATIONS

S. Yoshida, et al., "A Primal Study of auto-stereoscopic Display for Tabletop Tasks", Papers of the 14th Japan Virtual Reality Society Conference, 2009, w/ English abstract.

(Continued)

*Primary Examiner* — Sumati Lefkowitz
*Assistant Examiner* — Peijie Shen
(74) *Attorney, Agent, or Firm* — Westerman, Hattori, Daniels & Adrian, LLP

(57) ABSTRACT

A light ray controller has a circular frustum shape and is fitted in a circular hole of a top board such that its large diameter bottom opening faces upward. The light ray controller transmits a light ray while diffusing the light ray in a ridgeline direction and transmits the light ray straightforward without diffusing the light ray in a circumferential direction. A rotation module is provided under the table. One or more scanning projectors are provided on a circumference around an axis of the light ray controller on the rotation base of the rotation module. One or more scanning projectors are rotated by the rotation module. The controller controls one or more scanning projectors being rotated based on three-dimensional shape data stored in a storage.

11 Claims, 16 Drawing Sheets

(56) References Cited

U.S. PATENT DOCUMENTS

| | | | |
|---|---|---|---|
| 7,002,532 B2* | 2/2006 | Suyama et al. | 345/6 |
| 7,059,729 B2* | 6/2006 | Hoshino et al. | 353/94 |
| 7,098,872 B2* | 8/2006 | Geng | 345/30 |
| 7,233,441 B2* | 6/2007 | Sonehara | 359/462 |
| 7,364,300 B2 | 4/2008 | Favalora et al. | |
| 7,446,733 B1* | 11/2008 | Hirimai | 345/32 |
| 7,520,615 B2* | 4/2009 | Hoshino et al. | 353/10 |
| 7,648,243 B2* | 1/2010 | Shestak et al. | 353/7 |
| 7,771,054 B2* | 8/2010 | Otsuka et al. | 353/7 |
| 7,791,805 B2* | 9/2010 | Yokosawa | 359/626 |
| 8,144,079 B2* | 3/2012 | Mather et al. | 345/32 |
| 8,159,528 B2* | 4/2012 | Takayoshi | 348/51 |
| 8,212,768 B2* | 7/2012 | Fein et al. | 345/156 |
| 8,310,409 B2* | 11/2012 | Kondo et al. | 345/32 |
| 2001/0045920 A1* | 11/2001 | Hall et al. | 345/32 |
| 2003/0058209 A1* | 3/2003 | Balogh | 345/87 |
| 2003/0156077 A1* | 8/2003 | Balogh | 345/6 |
| 2005/0248972 A1* | 11/2005 | Kondo et al. | 365/125 |
| 2006/0181688 A1* | 8/2006 | Hoshino et al. | 353/122 |
| 2007/0146358 A1* | 6/2007 | Ijzerman | 345/419 |
| 2008/0036969 A1* | 2/2008 | Otsuka et al. | 353/7 |
| 2009/0190096 A1* | 7/2009 | Chen et al. | 353/7 |
| 2010/0177382 A1* | 7/2010 | De La Barre et al. | 359/463 |
| 2011/0007277 A1* | 1/2011 | Solomon | 353/7 |
| 2011/0157322 A1* | 6/2011 | Bennett et al. | 348/51 |
| 2011/0193814 A1* | 8/2011 | Gay et al. | 345/173 |
| 2012/0147003 A1* | 6/2012 | Liu et al. | 345/419 |
| 2013/0176193 A1* | 7/2013 | Liu et al. | 345/31 |

FOREIGN PATENT DOCUMENTS

| | | |
|---|---|---|
| JP | 2005-202126 A | 7/2005 |
| JP | 2008-064950 A | 3/2008 |
| JP | 2008-176180 A | 7/2008 |
| JP | 2010-032952 A | 2/2010 |

OTHER PUBLICATIONS

International Search Report for PCT/JP2010/005245, mailing date Sep. 28, 2010.

* cited by examiner

F I G. 4
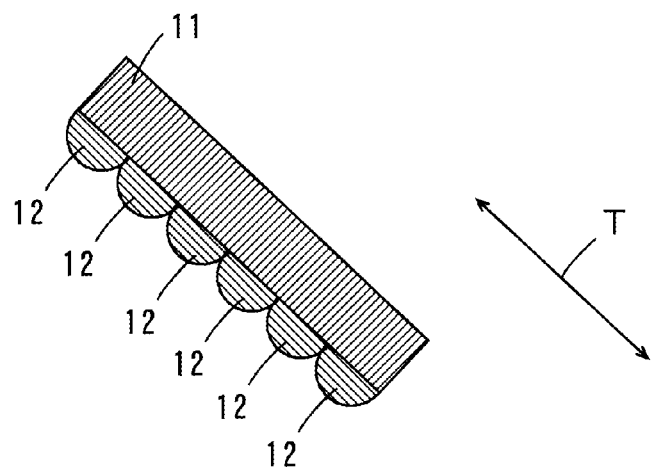
F I G. 5
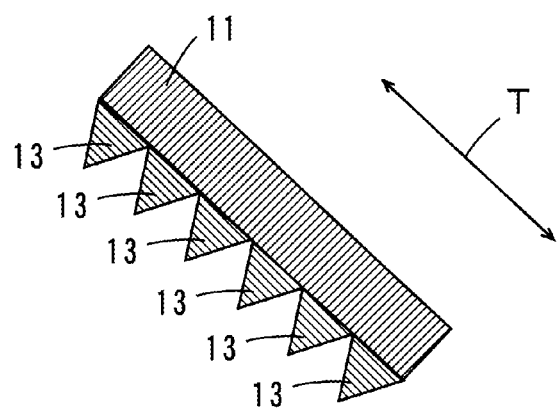
F I G. 6
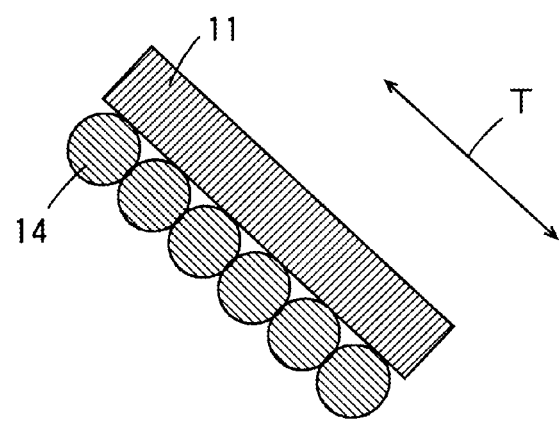

F I G. 9
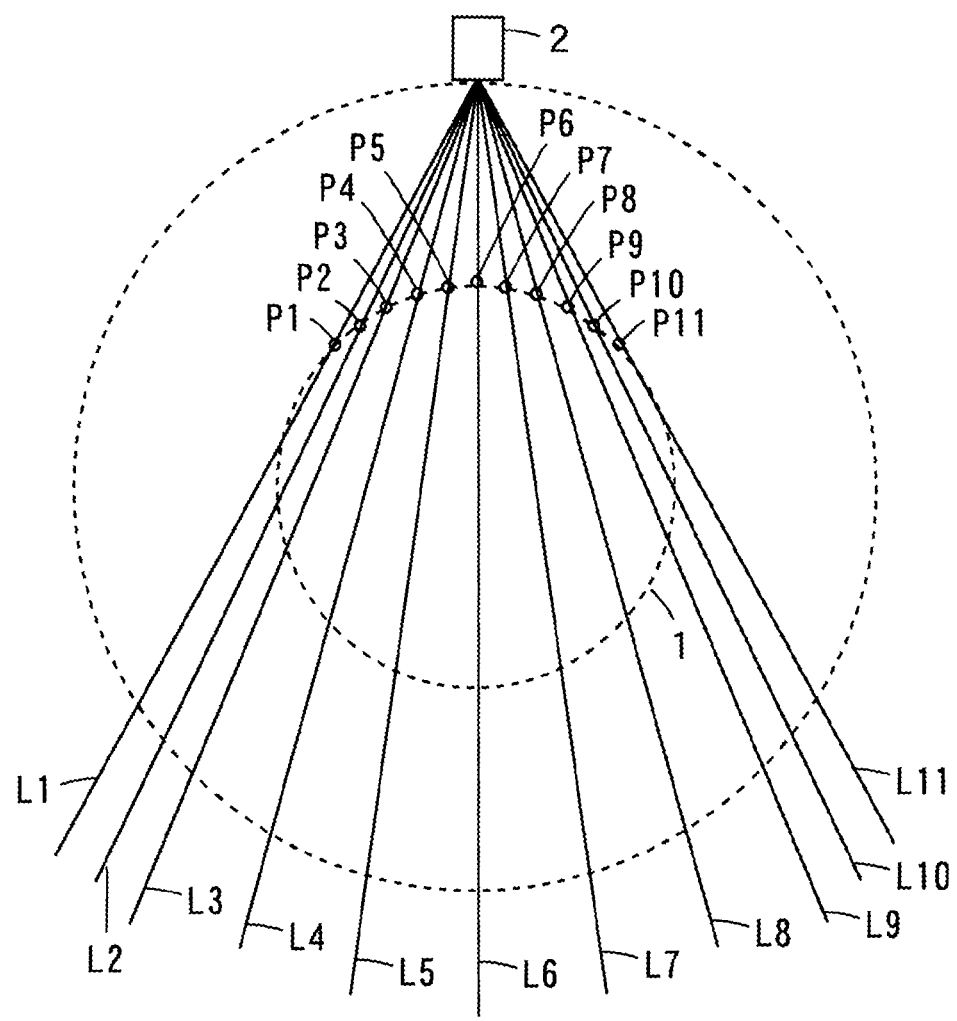

F I G. 1 0
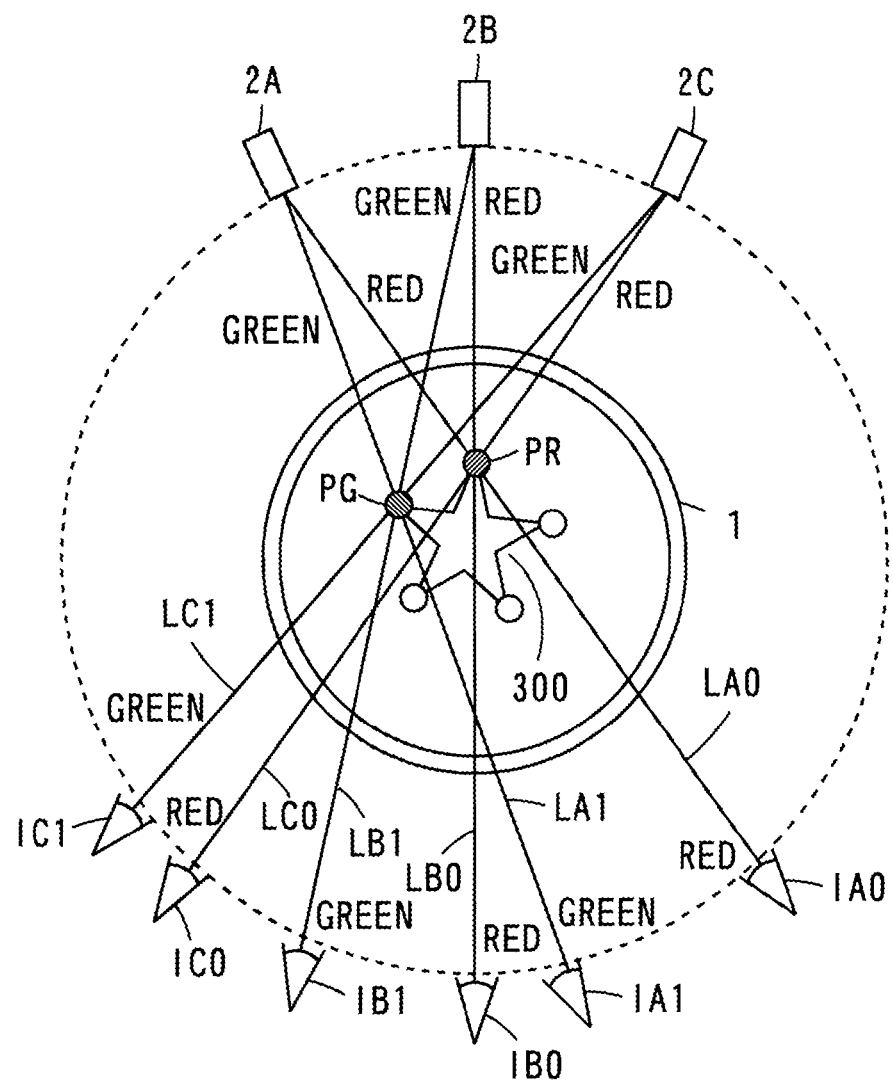

F I G. 1 2
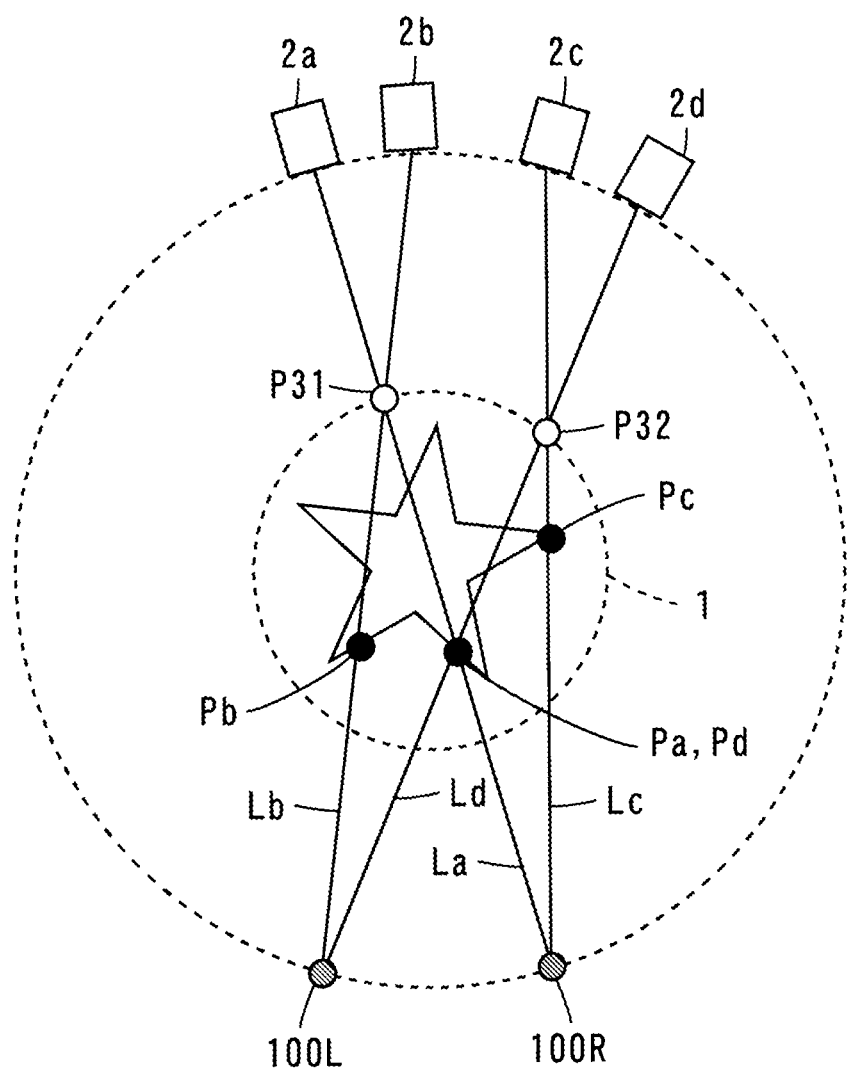

F I G. 1 5
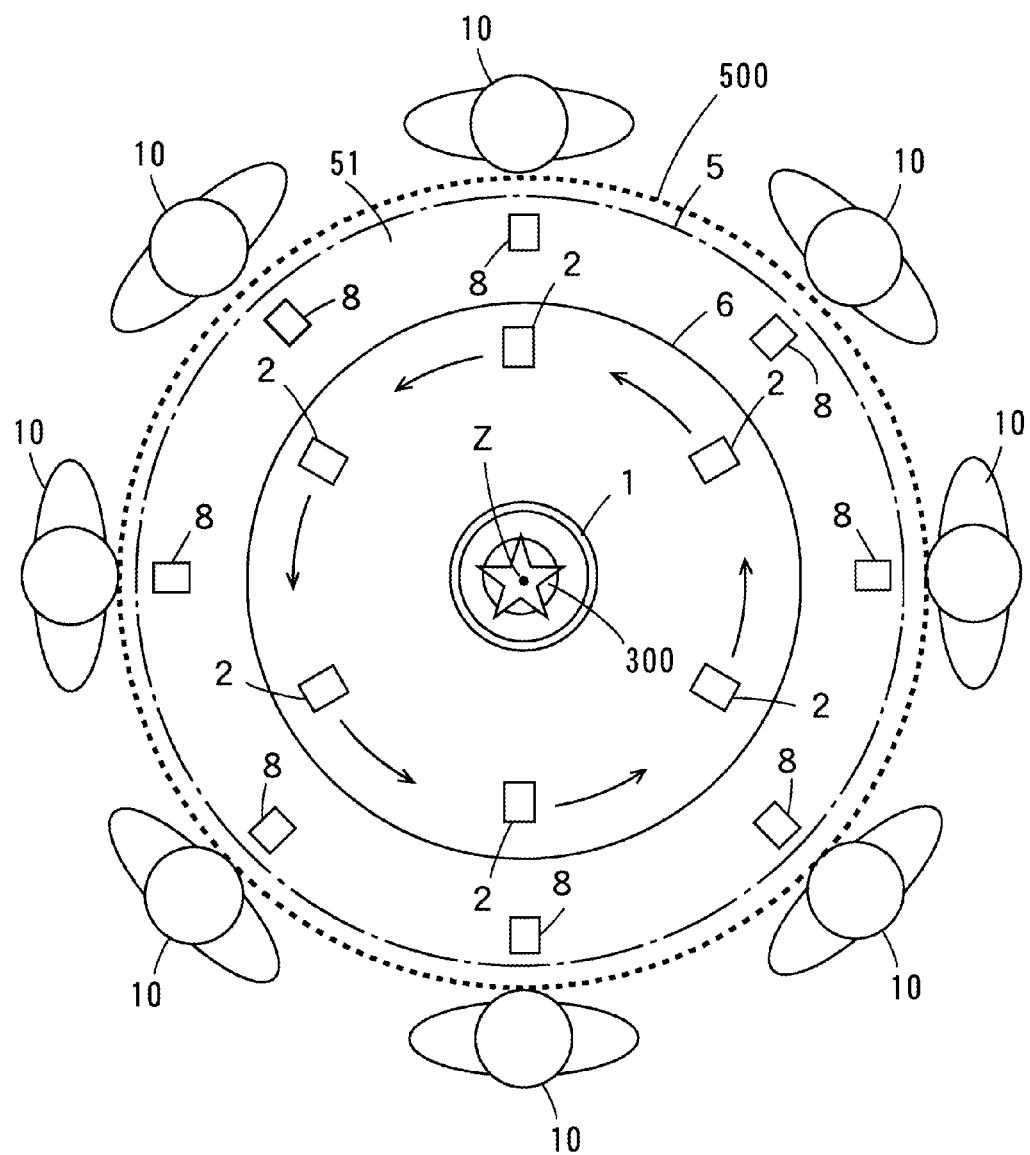

THREE-DIMENSIONAL DISPLAY

TECHNICAL FIELD

The present invention relates to a three-dimensional display that presents a three-dimensional image.

BACKGROUND ART

A number of people gather around a table and work together in various situations. Various studies have been conducted that consider a table as a tool for the people to work together and aid such cooperative work using the tool by a computer. Examples of such studies include studies about CSCW (Computer Supported Cooperative Work) and group wares.

Digitizing work on the table is advantageous for example in that the work process can be recorded electronically or information can be shared among remote places. Images displayed according to conventional studies are usually projected on a table by a projector or the table itself is made of a display such as an LCD (Liquid Crystal Display). In any of these cases, two-dimensional images are displayed.

Using such two-dimensional images, only document type information can be presented and stereoscopic type, three-dimensional shape information cannot be presented. In addition, when a single two-dimensional image is displayed, some of the people gathering around the table see the information upside down depending on the seating arrangement, which makes it hard to see the information.

In order to solve the former problem, a method of having a person wear a special pair of glasses to make a two dimensional image appear three dimensional has been suggested. According to the method, however, it is necessary to display a two-dimensional image while tracking the positions of people, which limits the number of participants or there is still some awkwardness caused by wearing the glasses, and it should hardly be natural observation of three-dimensional images.

In order to solve the latter problem, a system has been suggested in which a square table has its top surface made of a special screen to provide viewers positioned in the four different directions around the table with different images. In this case, a two-dimensional image is presented in each of the four directions, and therefore a special pair of glasses is necessary to make an image appear three dimensional.

A multi-direction real image display has been suggested that allows images to be viewed from multiple directions by arranging a plurality of CRT (Cathode Ray Tube) video displays, a plurality of mirrors for turning light paths back and a plurality of convex lenses in an annular shape (see Patent Document 1). However, the multi-direction real image display simply presents a plurality of two-dimensional images using the plurality of CRT video displays.

In the meantime, a system has been suggested that provides an image in the air based on an image displayed on a display using a relay optical system including lenses or mixes the image into a background using a half mirror. Using such a system, an image appears as if it is floating in the air, and therefore a pseudo-stereoscopic feeling can be obtained. However, what is presented is still a two-dimensional image and could not appear stereoscopic enough. Positions where a person can observe such an image are limited to particular viewing locations. Therefore, a plurality of people cannot view the image with ease.

A method of reconstructing a pseudo spatial image by projecting an image on a screen composed of a rotating disk or a plate movable in the front-back direction has been suggested. According to the method, a number of people can share and view a pseudo three-dimensional image by the naked eye. However, in order to present a three-dimensional image on a table, the screen as described above must be provided on the table. This limits a space available for work on the table.

[Patent Document 1] JP 2003-15081 A

SUMMARY OF INVENTION

Technical Problem

In a three-dimensional display used to support cooperative work on a table as described above, in order to easily join cooperative work without restrictions, it is desirable that a plurality of people can observe three-dimensional images by the naked eye without wearing a special device such as a pair of glasses or an eye tracking system. A three-dimensional image is desirably presented in an appropriate spatial position when a space above the table is viewed from any position within 360° around the table. It is also desirable that observing positions are not limited to particular viewing locations. It is also desirable that no device that obstructs work is necessary on a work surface of a table or the like.

An object of the present invention is to provide a three-dimensional display that presents a three-dimensional image that any number of viewers can view from any position without wearing any special device and without need of any device obstructing a work space.

Solution to Problem (1) According to one aspect of the present invention, a three-dimensional display for presenting a three-dimensional image based on three-dimensional shape data includes a light ray controller having a cone shape or a columnar shape and arranged such that a bottom of the cone shape or the columnar shape is opened on a reference plane, at least one light ray generator provided around the light ray controller so as to direct a light ray group including a plurality of light rays from under the reference plane and from the outside of the light ray controller to an external surface of the light ray controller, a rotating mechanism adapted to rotate the at least one light ray generator around a central axis of the light ray controller, and control means adapted to control the at least one light ray generator such that a three-dimensional image is presented based on the three-dimensional shape data by the light ray group generated by the at least one rotated light ray generator, and the light ray controller is formed to transmit each light ray directed by the at least one light ray generator without diffusing the light ray in a circumferential direction and to transmit the light ray while diffusing the light ray in a ridgeline direction.

In the three-dimensional display according to the one aspect of the invention, the light ray controller has a cone shape or a columnar shape. The light ray controller is provided such that the bottom of the cone shape is opened on the reference plane. At least one light ray generator is provided around the light ray controller to direct a light ray group of a plurality of light rays to the external surface of the light ray controller from under the reference plane and from the outside of the light ray controller. The light ray generator rotates around the central axis of the light ray controller by the rotation mechanism. The light ray generator is controlled by the control means such that a three-dimensional image is presented by the light ray group generated by the rotating light ray generator based on the three-dimensional shape data.

Note that the cone shape is not limited to a circular cone, an elliptical cone, or a pyramid but also includes a circular frustum, an elliptical frustum or a frustum of a pyramid. The columnar shape includes a cylindrical shape, an elliptic cylinder, and a prism.

In this case, the light ray controller transmits each light ray directed by the light ray generator without diffusing it in the circumferential direction. In this way, each crossing point of light rays from the light ray generator becomes a point light source. The viewer virtually perceives a collection of point light sources as a stereoscopic shape of a real object. At the time, binocular parallax is caused since the line-of-sight directions of left and right eyes are different. As a result, a three-dimensional image is presented by the collection of a plurality of point light sources.

Here, when the viewer observes an internal surface of the light ray controller from above the reference plane, each point light source can be seen such that the point light source is positioned at the same position when viewed from any position in the same height around the light ray controller. The viewer can view a three-dimensional image presented in a space above or in the light ray controller from any position within 360° around. Therefore, a plurality of people can view the three-dimensional image by the naked eye from any positions without using a special device. Also, the number of viewers is not limited.

The light ray controller transmits each light ray directed by the light ray generator while diffusing the light ray in the ridgeline direction. In this way, the position of the three-dimensional image appears moving up and down when the height of viewpoints of the viewer moves up and down. Therefore, the viewing locations of the viewer are not limited.

Furthermore, a device that obstructs tasks does not have to be provided in a space above the reference plane. Therefore, a work space for tasks using the presented three-dimensional image can be reliably obtained on the reference plane.

Since the light ray generator directs the light ray group to the external surface of the light ray controller while rotating, a continuous three-dimensional image with no disconnected part in the circumferential direction is presented.

(2) The reference plane may be a top surface of a top board of a table, the top board may have an opening, and the light ray controller may be fitted in the opening of the top board.

In this case, a three-dimensional image is presented in a space above the top board of the table. In this way, tasks using the same three-dimensional image can be carried out easily by a plurality of people around the table. Note that a lid made of a transparent material may be fitted in the opening.

(3) The at least one light ray generator may include a projector.

In this case, a light ray group of a plurality of light rays may easily be directed to the external surface of the light ray controller using the projector.

(4) The light ray controller may have projections formed so as to extend in the circumferential direction and to be arranged in the ridgeline direction on the external surface or an internal surface of the cone shape or the columnar shape.

In this case, each light ray can be transmitted without being diffused in the circumferential direction and transmitted while being diffused in the ridgeline direction by the projections on the external surface or the internal surface of the cone shape or columnar shape.

(5) The light ray controller may be formed by a sheet material that transmits a light ray without diffusing the light ray in a first direction and transmits the light ray while diffusing the light ray in a second direction orthogonal to the first direction.

In this case, each light ray can be transmitted without being diffused in the circumferential direction and transmitted while being diffused in the ridgeline direction by the sheet material with directivity.

(6) The control means may control the color of a light ray directed to the light ray controller by the at least one light ray generator for each emitting direction and for each rotational position of the at least one light ray generator.

In this case, a plurality of point light sources having colors at crossing points of a plurality of light rays controlled for each emitting direction and for each rotational position of the light ray generator are generated. Thus, a color three-dimensional image having high resolution is presented.

(7) The three-dimensional display may further includes a reflector provided under the reference plane and outside the light ray controller, the at least one light ray generator may be provided to emit a light ray group toward the reflector inside the reflector, and the reflector may be provided to reflect the light ray group emitted by the at least one light ray generator and direct the light ray group to the external surface of the light ray controller.

In this case, the light ray generator can be provided in a position closer to the central axis of the light ray controller. This can reduce the size of the rotation mechanism in the radial direction. Therefore, the light ray generator can be rotated at higher speed. Consequently, a high resolution three-dimensional image can be presented using a reduced number of light ray generators.

(8) The at least one light ray generator may include a plurality of light ray generators arranged at equiangular intervals around the light ray controller.

In this case, even if the rotation speed of the light ray generator by the rotation mechanism is relatively low, a three-dimensional image with high resolution can be presented.

(9) The three-dimensional display may further include detecting means for detecting eye positions of a viewer, the control means may control the at least one light ray generator based on the eye positions detected by the detecting means.

When the eye positions of the viewer are changed, a three-dimensional image visually recognized by the viewer deforms. Therefore, the light ray generator can be controlled based on the eye positions of the viewer detected by the detecting means, so that the deformation of the three-dimensional image depending on the eye positions of the viewer can be prevented.

(10) The control means may control the at least one light ray generator such that the position of each pixel of a three-dimensional image visually recognized by a viewer is constant regardless of the eye positions of the viewer.

In this case, a three-dimensional image visually recognized by the viewer can be constant regardless of the eye positions of the viewer.

(11) The control means may control the at least one light ray generator such that a reference three-dimensional image is presented when the eyes of a viewer are within a previously set viewing area and may correct the light ray group generated by the at least one light ray generator such that a three-dimensional image presented when the eyes of the viewer are positioned outside the previously set viewing area matches the reference three-dimensional image.

In this case, when the eyes of the viewer are in the predetermined viewing area, the reference three-dimensional image is presented. When the eyes of the viewer are outside the viewing area, a light ray group generated by the light ray generator is corrected such that a presented three-dimensional image matches the reference three-dimensional image. This surely prevents the deformation of the three-dimensional image caused depending on the eye positions of the viewer.

Advantageous Effects of Invention

According to the present invention, a three-dimensional image that any number of viewers can observe from any positions without wearing a special device and with no obstructing device in a work space can be presented.

BRIEF DESCRIPTION OF DRAWINGS

FIG. 4 is an enlarged cross sectional view of a part of an example of the light ray controller.

FIG. 5 is an enlarged cross sectional view of a part of another example of the light ray controller.

FIG. 6 is an enlarged cross sectional view of a part of yet another example of the light ray controller.

FIG. 9 is a schematic plan view for illustrating the operation of a scanning projector.

FIG. 10 is a schematic plan view for illustrating a method of presenting a three-dimensional image.

FIG. 12 is a schematic plan view for illustrating the principle of generating binocular parallax in a three-dimensional display according to an embodiment of the invention.

FIG. 15 is a schematic plan view of the three-dimensional display in FIG. 14.

DESCRIPTION OF EMBODIMENTS

Now, in order to facilitate understanding of the present invention, a three-dimensional display according to a reference mode will be described to begin with, followed by a description of three-dimensional displays according to embodiments of the present invention.

(1) Reference Mode (1-1) Structure of Three-Dimensional Display

Figure 1:
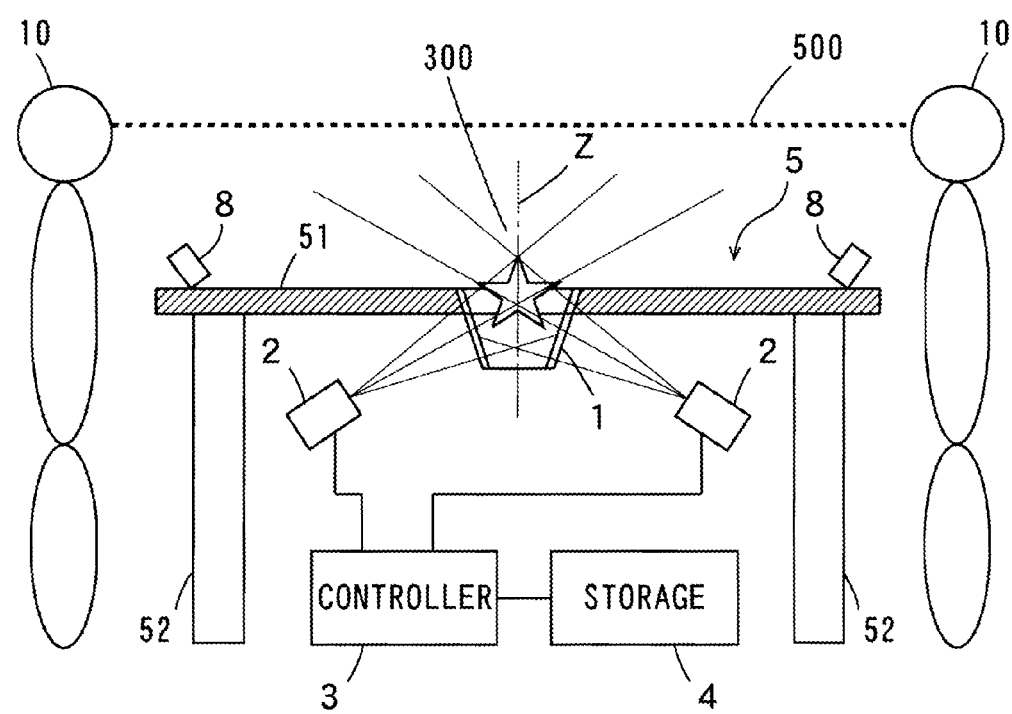
FIG. 1 is a schematic cross sectional view of a three-dimensional display according to a reference mode.
Figure 2:
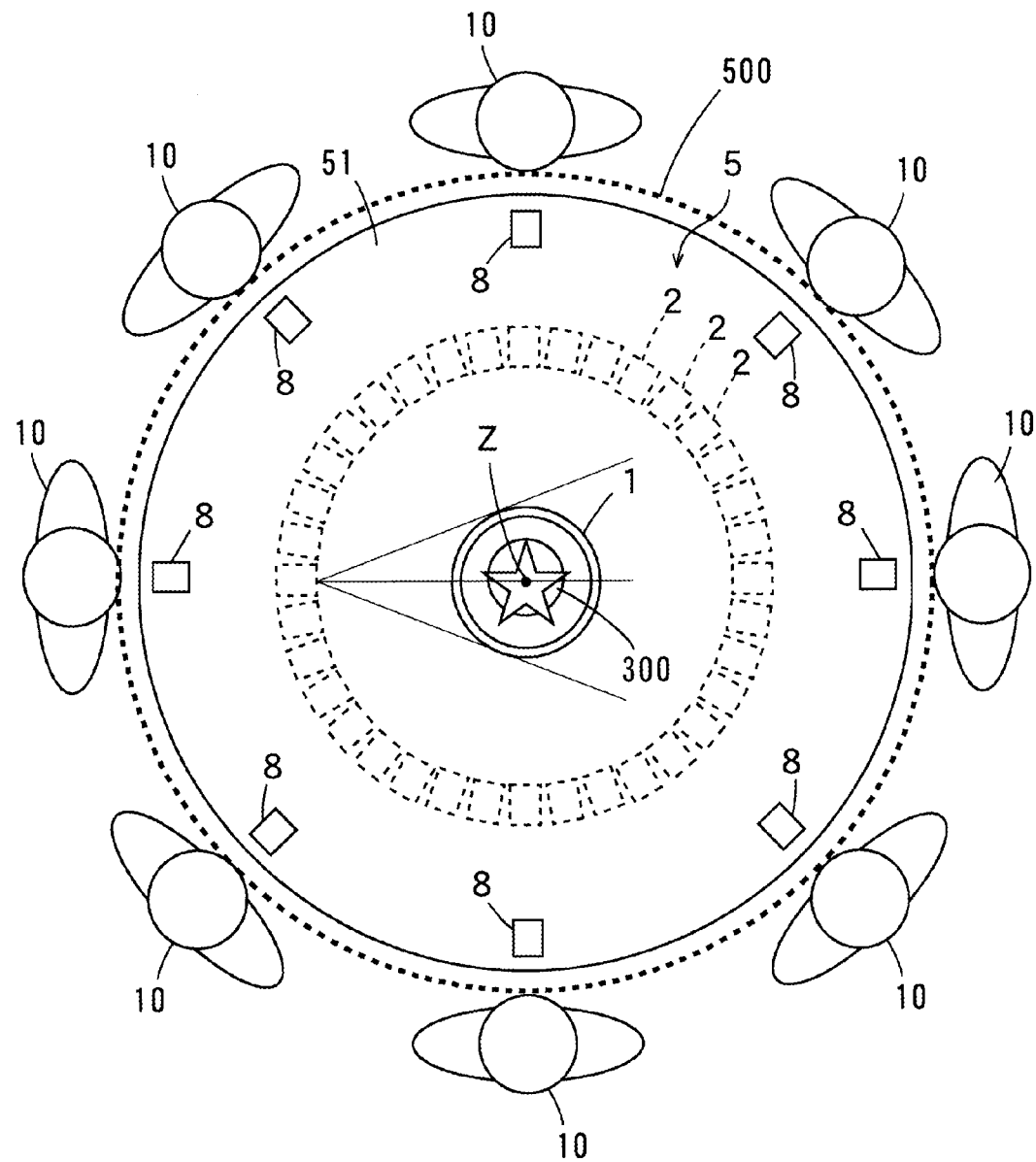
FIG. 2 is a schematic plan view of the three-dimensional display shown in FIG. 1.
Figure 3:
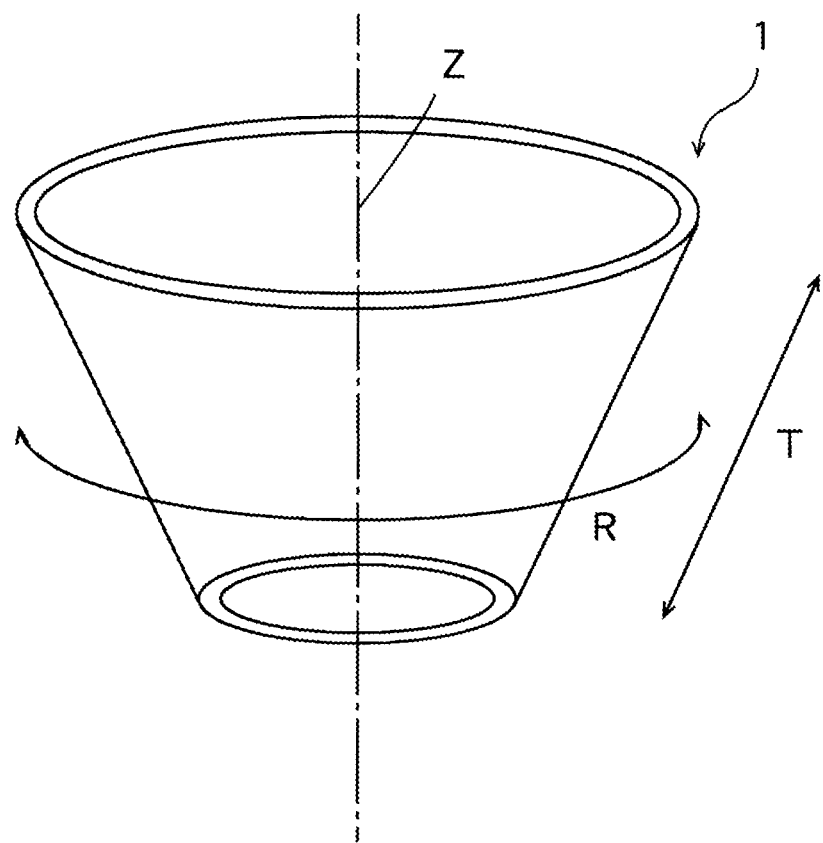
FIG. 3 is a perspective view of a light ray controller for use in the three-dimensional display shown in FIGS. 1 and 2.

FIG. 1 is a schematic cross sectional view of a three-dimensional display according to the reference mode. FIG. 2 is a schematic plan view of the three-dimensional display shown in FIG. 1. FIG. 3 is a perspective view of a light ray controller used in the three-dimensional display shown in FIGS. 1 and 2.

As shown in FIG. 1, the three-dimensional display includes a light ray controller 1 in a circular frustum shape, a plurality of scanning projectors 2, a controller 3, a storage 4, and a plurality of cameras 8.

The three-dimensional display shown in FIGS. 1 and 2 is provided on a table 5. The table 5 has a top board 51 and a plurality of legs 52. The top board 51 has a circular hole.

As shown in FIG. 3, the light ray controller 1 has a circular frustum shape that is rotationally symmetry with respect to an axis Z as the center. A large diameter bottom and a small diameter bottom of the light ray controller 1 are open. The light ray controller 1 is formed such that incoming light rays are diffused and transmitted in a ridgeline direction T, and they go straight and are transmitted without being diffused in a circumferential direction R around the axis Z. Details of the structure of the light ray controller 1 will be described later.

As shown in FIG. 1, the light ray controller 1 is fitted into the circular hole of the top board 51 such that the opening of the large diameter bottom faces upward. Viewers 10 positioned around the table 5 can observe an internal surface of the light ray controller 1 diagonally from above the top board 51.

Under the table 5, the plurality of scanning projectors 2 are arranged on a circumference of the light ray controller 1 around the axis Z. The plurality of scanning projectors 2 are provided to direct light rays on an external surface of the light ray controller 1 diagonally from below the light ray controller 1.

Note that a transparent circular plate may be fitted into the circular hole of the table 51 of the table 5.

Each of the scanning projectors 2 can direct a light ray and swing the light ray in horizontal and vertical planes. In this way, the scanning projectors 2 can scan the external surface of the light ray controller 1 with the light ray. Here, the "light ray" refers to non-diffusing light represented by a straight line.

The storage 4 is for example composed of a hard disk or a memory card. The storage 4 stores three-dimensional shape data used to present a three-dimensional image 300. The controller 3 is for example composed of a personal computer. The controller 3 controls the plurality of scanning projectors 2 based on the three-dimensional shape data stored in the storage 4. In this way, the three-dimensional image 300 is presented above the light ray controller 1.

The plurality of cameras 8 are arranged to pick up images of the faces of the viewers 10 positioned around the table 5. Image data obtained by the plurality of cameras 8 is provided to the controller 3. The controller 3 produces the eye positions (viewpoints) of each of the viewers 10 based on the image data provided from the plurality of cameras 8 and makes a correction of a light ray group by eye tracking that will be described.

(1-2) Structure of Light Ray Controller 1 and Manufacturing Method Thereof

FIG. 4 is an enlarged cross sectional view of a part of an example of the light ray controller 1.

The light ray controller 1 in FIG. 4 has a transparent light ray controller main body 11 in a circular frustum shape. A plurality of annular lenses 12 are arranged densely next to each other in the ridgeline direction T on an external surface of the light ray controller main body 11. The annular lenses 12 each have a half-oval shaped vertical cross section. Note that the annular lenses 12 may have a semi-circular cross section. The light ray controller 1 may have any size. For example, the large diameter bottom of the light ray controller main body 11 has a diameter of 200 mm and the small diameter bottom has a diameter of 20 mm and its height is 110 mm.

The light ray controller 1 in FIG. 4 can be fabricated by abutting a cutting blade against a transparent material made of transparent resin having a certain refractive index such as acryl and polycarbonate while rotating the transparent material. The light ray controller 1 can also be fabricated by making a die having a shape corresponding to the light ray controller 1 and filling the die with transparent resin such as acryl and polycarbonate. Furthermore, the light ray controller 1 can be fabricated by a solid fabrication method using ultraviolet curing resin. The light ray controller 1 can also be fabricated by etching the surface of a transparent material having a circular frustum shape. Further, the light ray controller 1 can be fabricated by subjecting the surface of a transparent material having a circular frustum shape to laser beam processing or electric discharge processing. In addition, the light ray controller 1 can be fabricated by applying ultraviolet curing resin on the surface of a transparent material having a circular frustum shape and irradiating each of annular regions having a fixed width extending in the circumferential direction with a ultraviolet beam.

Although the plurality of annular lenses 12 are formed at the external surface of the light ray controller main body 11 in the example in FIG. 4, the plurality of annular lenses 12 may be formed at the internal surface of the light ray controller main body 11.

In the light ray controller 1 in FIG. 4, the annular lenses 12 have a fixed thickness in the circumferential direction and function to diffuse a light ray in the ridgeline direction T. In this way, when a light ray is directed to the external surface of the light ray controller 1 in FIG. 4, the light ray is transmitted while being diffused in the ridgeline direction T, and it is transmitted straightforward without being diffused in the circumferential direction.

FIG. 5 is an enlarged cross sectional view of a part of another example of the light ray controller 1.

In the light ray controller 1 in FIG. 5, a plurality of annular prisms 13 having a polygonal cross section are arranged closely next to each other on the external surface of the light ray controller main body 11 in the ridgeline direction. The cross sectional shape of the annular prism 13 may be a polygon other than a triangle.

In the light ray controller 1 in FIG. 5, the annular prisms 13 have a fixed thickness in the circumferential direction and function to diffuse a light ray in the ridgeline direction T. In this way, when a light ray is directed to the external surface of the light ray controller 1 in FIG. 5, the light ray is transmitted while being diffused in the ridgeline direction T, and it is transmitted straightforward without being diffused in the circumferential direction.

FIG. 6 is an enlarged cross sectional view of a part of yet another example of the light ray controller 1.

The light ray controller 1 in FIG. 6 is fabricated by winding a string-shaped transparent member with a certain refractive index on the external surface of the transparent light ray controller main body 11 in a circular frustum shape in the circumferential direction. The transparent member 14 is densely arranged in the ridgeline direction T. The transparent member 14 may have a circular cross section or an elliptical cross section. The transparent member 14 may be for example a nylon string.

Furthermore, the light ray controller 1 may be fabricated by attaching a plurality of string shaped transparent members on the external surface of the light ray controller main body 11 in the circular frustum shape with a quick drying adhesive. An example of the adhesive may include ultraviolet curing resin.

In the light ray controller 1 in FIG. 6, the transparent member 14 has a fixed thickness in the circumferential direction and function as ball lenses in the ridgeline direction T. In this way, when a light ray is directed to the external surface of the light ray controller 1, the light ray is transmitted while being diffused in the ridgeline direction T, and it is transmitted straightforward without being diffused in the circumferential direction.

The arrangement pitch for the annular lenses 12, the annular prisms 13 and the transparent member 14 (the distance between their centers) in the light ray controller 1 in FIGS. 4 to 6 is preferably not more than 1 mm, for example from 0.4 mm to 0.5 mm.

Figure 7:
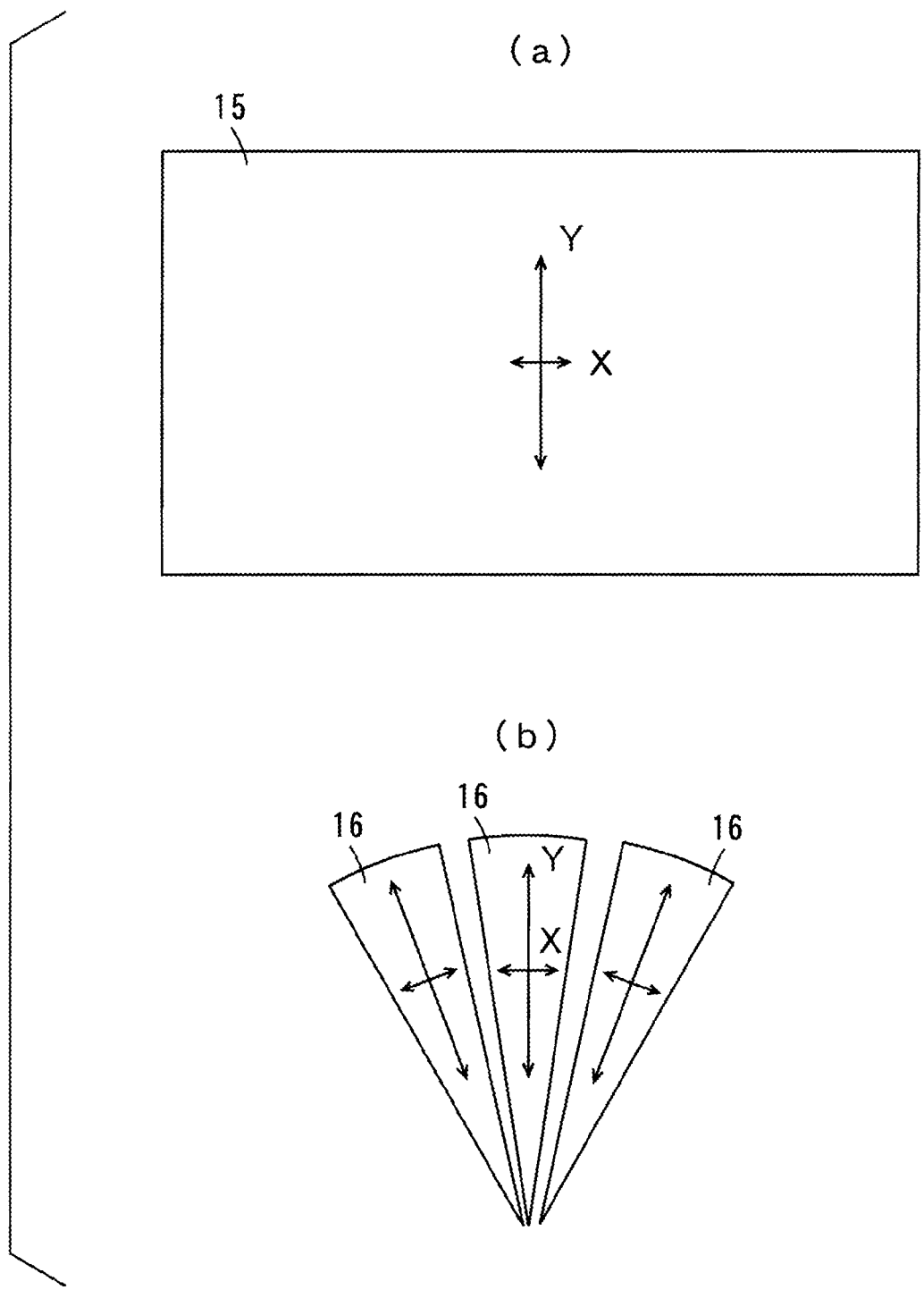
FIG. 7 is a schematic view for illustrating another structure of the light ray controller.

FIG. 7 is a schematic view for illustrating another structure of the light ray controller 1. FIG. 7(a) shows a holoscreen 15 that transmits a light ray while hardly diffusing it in a direction X and transmits the light ray while diffusing it in a direction Y that is orthogonal to the direction X. FIG. 7(b) shows triangular sheets 16 formed by cutting the holoscreen 15 shown in FIG. 7(a). Here, the "holoscreen" refers to an optical element fabricated by photographic dry plate technology and capable of controlling the traveling direction of an incoming light ray.

The light ray controller 1 can be formed by attaching the triangular sheet 16 in FIG. 7(b) on the surface of the transparent light controller main body 11 in the circular frustum shape. Alternatively, the light ray controller 1 having a pseudo circular frustum shape can be fabricated by joining a plurality of the triangular sheets 16 to form an N-gonal frustum. Here, N is an integer equal to or larger than 3.

Figure 8:
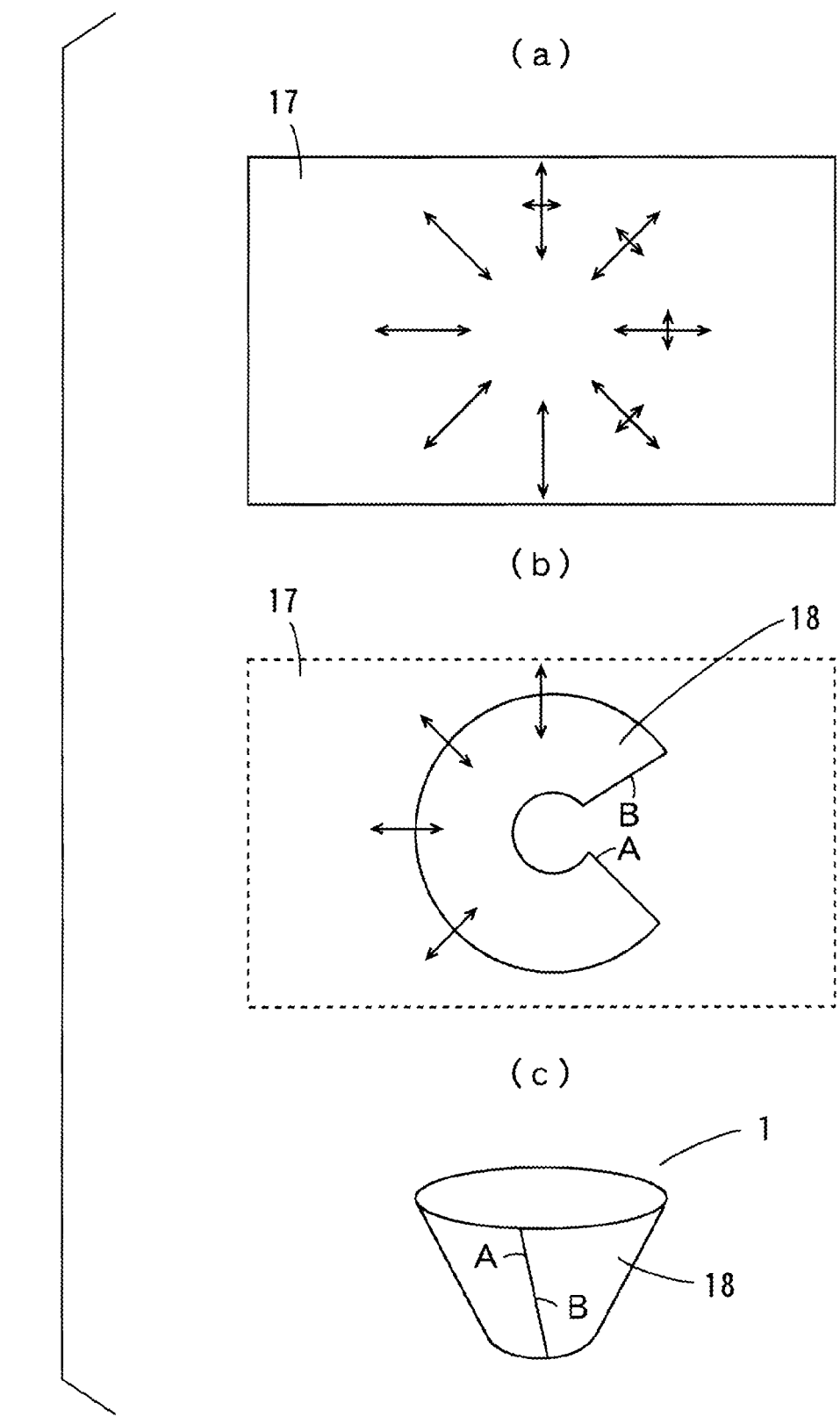
FIG. 8 is a schematic view for illustrating yet another structure of the light ray controller.

FIG. 8 is a schematic view for illustrating yet another example of the structure of the light ray controller 1. FIG. 8(a) shows an optical sheet 17 made of a holoscreen or a Fresnel lens that has the function of diffusing an incoming light ray in a radiation direction. The Fresnel lens is a sheet type lens having grooves in a circumferential direction.

As shown in FIG. 8(b), the above-described optical sheet 17 is cut into a sectorial sheet 18. As shown in FIG. 8(c), the sides A and B of the sectorial sheet 18 are joined to fabricate the light ray controller 1 having a circular frustum shape.

According to the embodiment, although the light ray controller 1 has a circular frustum shape, the invention is not limited to the same, the light ray controller 1 may have a cone shape, the light ray controller 1 may have a polygonal frustum shape, or the light ray controller 1 may have a polygonal pyramid shape. These shapes are referred to as cone shapes.

(1-3) Operation of Scanning Projectors 2

FIG. 9 is a schematic plan view for illustrating the operation of the scanning projector 2. FIG. 9 shows only a single scanning projector 2.

The scanning projector 2 can emit light ray composed of laser light and swing the light ray in a horizontal plane and a vertical plane.

The scanning projectors 2 swing the light ray within a horizontal plane, so that the external surface of the light ray controller 1 can be scanned in the horizontal direction. The scanning projector 2 swings the light ray in the vertical plane, so that the external surface of the light ray controller 1 can be scanned in the vertical direction. In this way, the scanning projector 2 can scan the opposed surface of the light ray controller 1 with the light ray.

The scanning projector 2 can set a color for a light ray in every light ray direction. In this way, the scanning projector 2 emits a light ray group apparently including of a plurality of light rays.

In FIG. 9, the scanning projector 2 directs a plurality of light rays L1 to L11 to the light ray controller 1. The light rays L1 to L11 are each set to any color. In this way, the light rays L1 to L11 in the set colors are transmitted through the light ray controller 1 in a plurality of positions P1 to P11, respectively.

The light ray controller 1 transmits the light rays L1 to L11 straightforward without diffusing them in the circumferential direction, so that a viewer can visually recognize only a single light ray in a certain position. The light ray controller 1 transmits the light rays L1 to L11 while diffusing them in the vertical direction, so that the viewer can visually recognize a single light ray in any position in the vertical direction.

Note that in the present embodiment, although the scanning projector 2 is used as a light ray generator, the invention is not limited to the same. As the light ray generator, a general projector including a spatial light modulator such as a DMD (Digital Mirror Device), an LCOS (Liquid Crystal on Silicon) or an LCD (Liquid Crystal Display) and a projection system such as a lens array including a plurality of lenses can be used. In this case, when the apertures of the projecting system are sufficiently small, a group of light rays can be formed similarly to the scanning projector 2.

(1-4) Method of Presenting Three-Dimensional Image 300

FIG. 10 is a schematic plan view for illustrating a method of presenting a three-dimensional image 300. FIG. 10 shows three scanning projectors 2A, 2B, and 2C.

For example, when a red pixel is presented in a position PR above the light ray controller 1, a red light ray LA0 is emitted in a direction passing the position PR from the scanning projector 2A, a red light ray LB0 is emitted in a direction passing the position PR from the scanning projector 2B, and a red light ray LC0 is emitted in a direction passing the position PR from the scanning projector 2C. In this way, a red pixel to be a point light source is presented at a crossing point of the red light rays LA0, LB0, and LC0. In this case, the red pixel is observed in the position PR when the eyes of a viewer are in the position IA0, IB0 and IC0.

Similarly, when a green pixel is presented in a position PG above the light ray controller 1, a green light ray LA1 is emitted in a direction passing the position PG from the scanning projector 2A, a green light ray LB1 is emitted in a direction passing the position PG from the scanning projector 2B, and a green light ray LC1 is emitted in a direction passing the position PG from the scanning projector 2C.

Thus, a green pixel to be a point light source is presented at a crossing point of the green light rays LA1, LB1, and LC1. In this case, the green pixel is observed in the position PG when the eyes of a viewer are in the position IA1, IB1 and IC1.

In this way, light rays in colors to be presented in directions passing through positions in the three-dimensional image 300 are emitted from each of the plurality of scanning projectors 2A, 2B, and 2C.

When the plurality of scanning projectors including the scanning projectors 2A, 2B, and 2C are arranged densely next to each other on a circumference and the inside space of the light ray controller 1 is sufficiently densely filled with groups of crossing points by groups of light rays directed from the plurality of scanning projectors, appropriate light rays passing the positions PR and PG come into human eyes as the inside of the light ray controller 1 is observed from any direction on the circumference. Therefore, human eyes perceive as if point light sources exit there. Since a person recognizes illumination light reflected or diffused at the surface of a real object as an object, the collection of point light sources can be considered as the surface of the object. More specifically, a three-dimensional image 300 can be presented by appropriately reproducing the colors in the positions PR and PG to be a surface of the object using light rays traveling from the plurality of projectors 2A, 2B, and 2C.

In this way, the three-dimensional image 300 can be presented in a space inside and above the light ray controller 1. In this case, viewers can visually recognize the same three-dimensional image 300 in different positions in the circumferential direction and from different directions.

Figure 11:
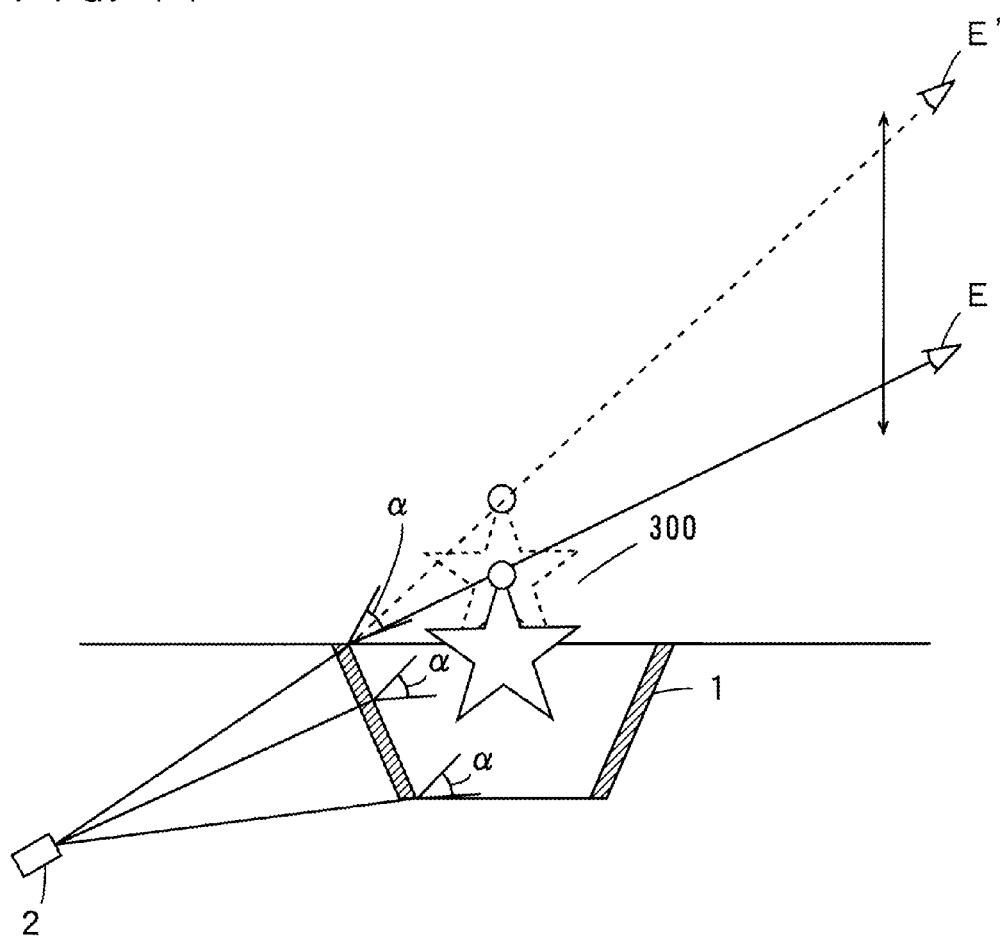
FIG. 11 is a schematic sectional view for illustrating a method of presenting a three-dimensional image.

FIG. 11 is a schematic sectional view for illustrating a method of presenting the three-dimensional image 300. In FIG. 11, a single scanning projector 2 is shown.

As shown in FIG. 11, a light ray emitted from the scanning projector 2 is diffused in the vertical direction at a diffusion angle $\alpha$ by the light ray controller 1. Thus, a viewer can view a light ray in the same color emitted from the scanning projector 2 in different positions in the vertical direction within the range of the diffusion angle $\alpha$. For example, when a viewer moves his/her line of sight from a reference position E to an upper position E', the viewer can view the same part of the three-dimensional image 300. In this case, the position of the three-dimensional image 300 viewed by the viewer moves depending on the eye positions of the viewer in the vertical direction. In this way, since a light ray emitted from the scanning projector 2 is diffused in the vertical direction by the light ray controller 1, the three-dimensional image 300 can be observed if the viewer moves the line of sight up and down.

The color of each of light rays in light ray groups emitted by the plurality of scanning projectors 2 in FIG. 1 is calculated by the controller 3 based on the three-dimensional shape data stored in the storage 4. More specifically, the controller 3 obtains a crossing point of a surface of a stereoscopic shape pre-defined as the three-dimensional shape data and each light ray and calculates a suitable color to be applied to the light ray.

The controller 3 controls the plurality of scanning projectors 2 based on the calculated color of each of light rays in the light ray groups. In this way, a group of light rays having the calculated colors is emitted from each of the scanning projectors 2 such that a three-dimensional image 300 is presented above the light ray controller 1.

As described above, the three-dimensional display according to the embodiment allows directional display of the three-dimensional image 300.

(1-5) Principle of Generating Binocular Parallax

Now, the principle of generating binocular parallax in the three-dimensional display according to the embodiment will be described.

FIG. 12 is a schematic plan view for illustrating the principle of generating binocular parallax in the three-dimensional display according to the embodiment. FIG. 12 shows four scanning projectors 2a, 2b, 2c, and 2d.

In FIG. 12, when a viewer sees a point P31 on the light ray controller 1, a light ray La emitted from the scanning projector 2a comes into the right eye 100R and a light ray Lb emitted from the scanning projector 2b comes into the left eye 100L. When the viewer sees a point P32 on the light ray controller 1, a light ray Lc emitted from the scanning projector 2c comes into the right eye 100R and a light ray Ld emitted from the scanning projectors 2d comes into the left eye 100.

Assume now that the colors of the light rays La and Ld are the same, the colors of the light ray Lb and light ray La are different, and the colors of the light ray Lc and the light ray Ld are different. In this case, the color of the point P31 on the light ray controller 1 differs depending on viewing directions. The color of the point P32 on the light ray controller 1 also differs depending on viewing directions.

A point Pa of a three-dimensional image 300 is produced by the light ray La, a point Pb is of the three-dimensional image 300 is produced by the light ray Lb, a point Pc of the three-dimensional image 300 is produced by the light ray Lc, and a Pd of the three-dimensional image 300 is produced by the light ray Ld.

In the example in FIG. 12, the points Pa and Pd of the three-dimensional image 300 are in the same position. That is to say, the points Pa and Pd of the three-dimensional image 300 are produced at a crossing of the light rays La and Ld. The points Pa and Pd can be considered as virtual point light sources. In this case, the direction in which the right eye 100R sees the points Pa and Pd is different from the direction in which the left eye 100L sees the points Pa and Pd. More specifically, there is an angle of convergence between the line-of-sight direction of the right eye 100R and the line-of-sight direction of the left eye 100L. This makes an image formed by a group of light rays appear stereoscopic.

(1-6) Function of Correcting Light Ray Group by Eye Tracking

When a plurality of viewers 10 are seated around the table 5, it can be considered that the eyes of the viewers 10 are located substantially a fixed distance apart from the axis Z of the light ray controller 1 and substantially in a fixed level (in a reference position). Therefore, as shown in FIGS. 1 and 2, a circular viewing area in which the eyes of the plurality of viewers 10 are positioned is specified as a circular viewing area 500.

The controller 3 controls the scanning projectors 2 based on the assumption that the eyes of the plurality of viewers 10 are in the circular viewing area 500. In this way, when the eyes of the viewers 10 are in the circular viewing area 500, the viewers 10 can visually recognize the three-dimensional image 300 having the same shape in the same height.

As described in conjunction with FIG. 11, the position of each pixel of the three-dimensional image 300 visually recognized by a viewer 10 moves depending on the eye positions of the viewer 10 in the vertical direction. Therefore, when the eyes of the viewer 10 are positioned outside the circular viewing area 500, the three-dimensional image 300 looks deformed.

Therefore, in the three-dimensional display according to the reference mode, a light ray group directed to the light ray controller 1 from each of the scanning projectors 2 is corrected based on the eye positions of each of the viewers 10 detected by eye tracking.

Figure 13:
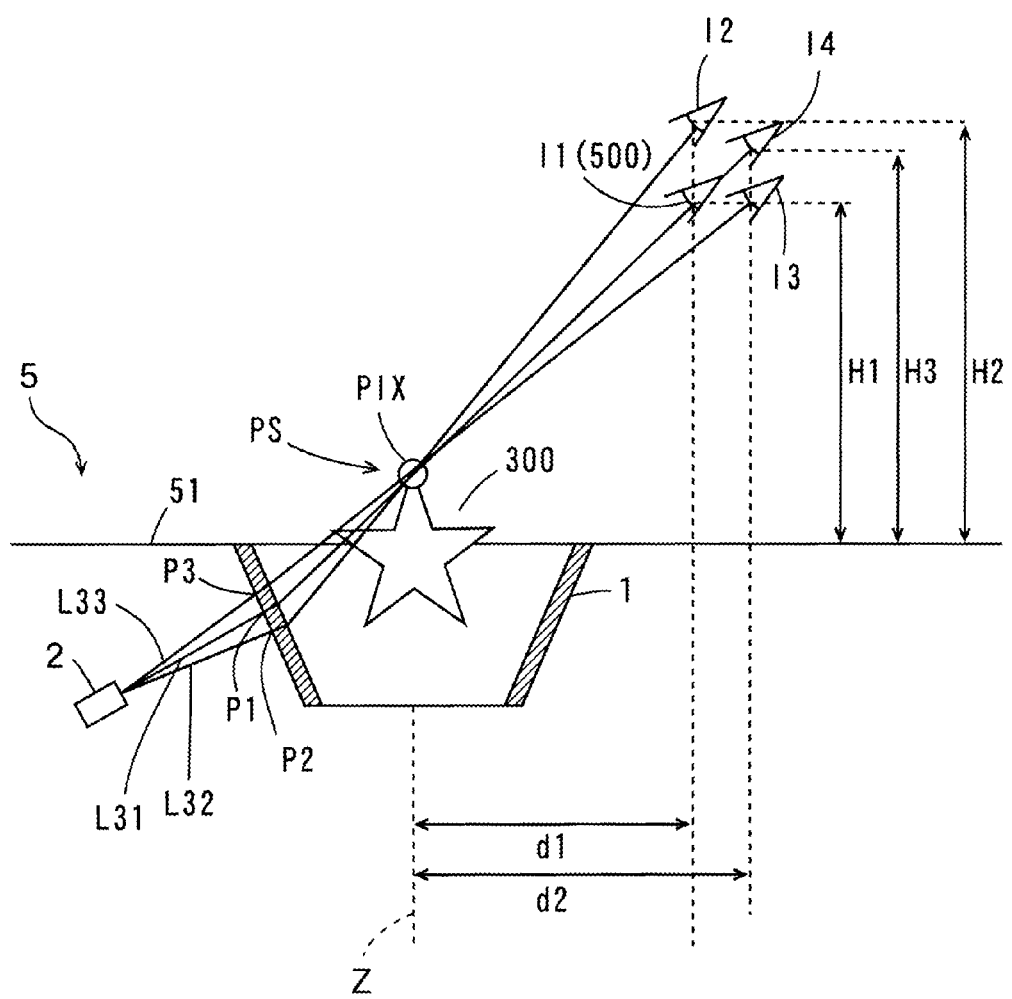
FIG. 13 is a view for illustrating how a light ray group is corrected when the eyes of a viewer are positioned outside a circular viewing area.

FIG. 13 is a view for illustrating correction of a light ray group when the eyes of a viewer 10 are outside the circular viewing area 500.

In FIG. 13, the circular region 500 is positioned a distance d1 apart from the axis Z of the light ray controller 1 in the horizontal direction and in a height H1 from the top board 51 of the table 5. Now, a method of presenting one pixel PIX of the three-dimensional image 300 in a standard position PS above the light ray controller 1 will be described.

When an eye of a viewer is in a position I1 on the circular viewing area 500, a light ray L31 having the color of the pixel PIX of the three-dimensional image 300 is directed to the position P1 on the external surface of the light ray controller 1 from the scanning projector 2. The light ray L31 directed to the position P1 is diffused in the vertical direction by the light ray controller 1 and the single diffused light ray is passed through the standard position PS and comes into the eye of the viewer in the position I1. In this way, the viewer can visually recognize the pixel PIX in the standard position PS.

When the eye of the viewer is in a position I2 which is in a height H2 above the circular viewing area 500, a light ray L32 having the color of the pixel PIX of the three-dimensional image 300 is directed to a position P2 on the external surface of the light ray controller 1 from the scanning projector 2. The light ray L32 directed to the position P2 is diffused in the vertical direction by the light ray controller 1 and the single diffused light ray is passed through the standard position PS and comes into the eye of the viewer in the position I2. In this way, the viewer can visually recognize the pixel PIX in the standard position PS.

When the eye of the viewer is in the position I3 in the same height as that of the circular viewing area 500 and a distance d2 apart from the axis Z in the horizontal direction, a light ray L33 having the color of the pixel PIX of the three-dimensional image 300 is directed to a position P3 on the external surface of the light ray controller 1 from the scanning projector 2. The light ray L32 directed to the position P3 is diffused in the vertical direction by the light ray controller 1 and the single diffused ray is passed through the standard position PS and comes into the eye of the viewer in the position I3. In this way, the viewer can visually recognize the pixel PIX in the standard position PS.

More specifically, the controller 3 calculates the coordinates of the eye position of a viewer based on image data provided from a camera 8. When the eye positions of the viewer is on the circular region 500, the controller 3 controls the scanning projector 2 such that the light ray L31 having the color of the pixel PIX is directed to the position P1 where a straight line passing through the eye position and the standard position PS crosses the light ray controller 1.

When the eye position of the viewer is at a different position from the circular region 500, the controller 3 controls the scanning projector 2 such that a light ray having the color of the pixel PIX is directed to a position where a straight line passing through the eye position and the standard position PS crosses the light ray controller 1.

In this way, the controller 3 corrects the direction of the light ray for presenting the pixel PIX in the standard position PS depending on the eye position of the viewer. In other words, the controller 3 corrects the color of each light ray in the light ray group emitted from the scanning projector 2 such that the light ray having the color of the pixel PS comes into the eye of the viewer depending on the eye position of the viewer. As a result, the viewer can visually recognize the three-dimensional image 300 having the same shape regardless of where the eyes are positioned.

Note that as long as the eye of viewer is on a straight line passing through the circular viewing area 500 and the standard position PS, even if the eye of the viewer is at different position from the circular viewing area, the light ray L31 having the color of the pixel PIX in the three-dimensional image 300 is directed to the position P1 on the external surface of the light ray controller 1 from the scanning projector 2 similarly to the case where the eye of the viewer is on the circular region 500. In this way, the viewer can visually recognize the pixel PIX in the standard position PS.

As described above, a group of light rays emitted from the scanning projectors 2 is corrected depending on the viewer's eye positions, so that the three-dimensional image 300 is presented without deformation regardless of positions of the viewer's eyes.

(1-7) Effects of Reference Mode

In the three-dimensional display according to the reference mode, the light ray controller 1 transmits light rays directed by scanning projectors 2 without diffusing them in the circumferential direction. In this way, each of crossing points of the light rays from the plurality of scanning projectors 2 becomes a point light source. The viewer virtually perceives a collection of point light sources as a stereoscopic shape of a real object. At the time, since the direction of line of sight by the left eye and the direction of the line of sight by the right eye crossing the same light point source are different, binocular parallax is caused. Consequently, the three-dimensional image 300 is presented in a space inside and above the light ray controller 1 by the collection of the plurality of point light sources.

Here, when a viewer observes the internal surface of the light ray controller 1 from above the table 5, the viewer can see a point light source at the same position when viewing it from any position in the same height around the table 5. Therefore, the viewer can see the three-dimensional image 300 presented above the light ray controller 1 from any position within 360° around. Therefore, a plurality of people can observe the three-dimensional image 300 by the naked eye without using a special device. In addition, the number of viewers is not limited.

The light ray controller 1 transmits each of light rays directed by the scanning projectors 2 while diffusing them in the ridgeline direction. In this way, when the height of the viewpoint of a viewer moves up and down, the viewer can view the three-dimensional image 300. Therefore, the viewing locations of the viewer are not limited.

Furthermore, a device that obstructs tasks does not have to be provided in a space above the table 5. Therefore, a work space for tasks using the three-dimensional image 300 presented above the light ray controller 1 can be reliably obtained on the table 5.

The three-dimensional image 300 can be presented without being deformed regardless of the eye positions of the viewer by correcting groups of light rays emitted from the scanning projectors 2 depending on the eye positions of the viewer.

(2) First Embodiment

In the three-dimensional display according to the reference mode described above, a plurality of scanning projectors 2 need to be provided densely in the circumferential direction in order to present a continuous three-dimensional image 300 with no disconnected part in the circumferential direction. This increases the manufacturing cost of the three-dimensional display.

With a three-dimensional display according to an embodiment of the present invention in the following, a continuous three-dimensional display 300 can be presented using a reduced number of scanning projectors 2.

(2-1) Structure of Three-Dimensional Display

Figure 14:
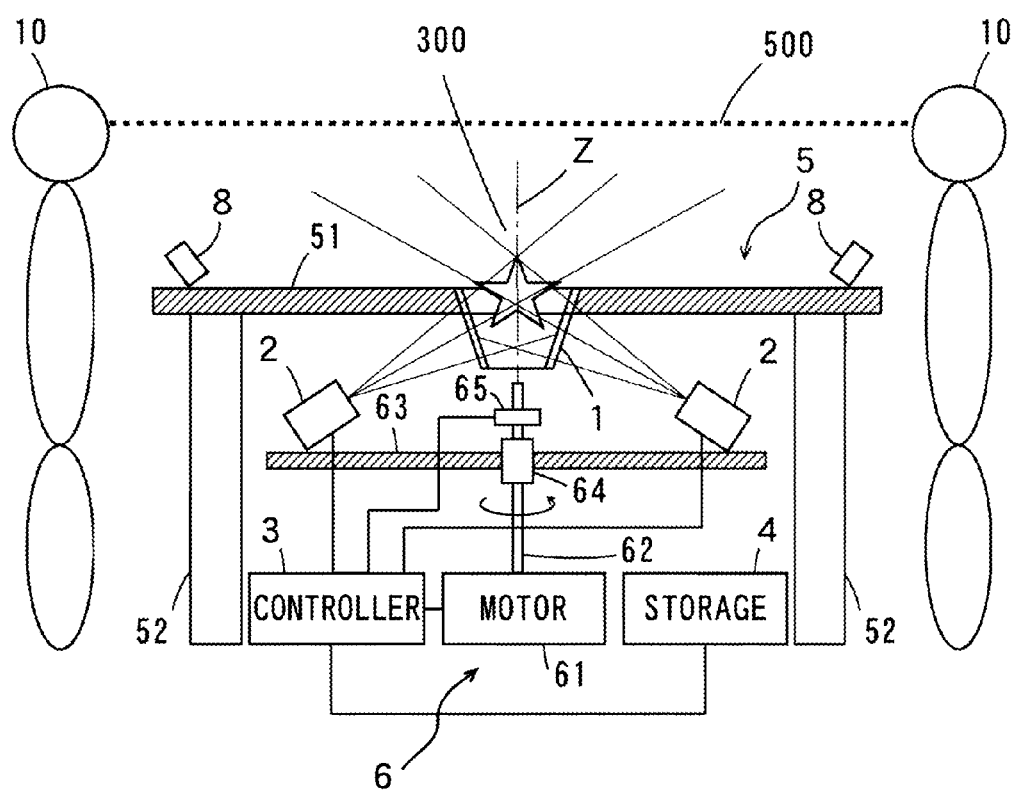
FIG. 14 is a schematic cross sectional view of a three-dimensional display according to a first embodiment of the invention.

FIG. 14 is a schematic cross sectional view of a three-dimensional display according to a first embodiment of the present invention. FIG. 15 is a schematic plan view of the three-dimensional display in FIG. 14.

As shown in FIG. 14, the three-dimensional display includes a light ray controller 1 in a circular frustum shape, a plurality of scanning projectors 2, a controller 3, a storage 4, a rotation module 6, and a plurality of cameras 8.

The three-dimensional display in FIGS. 14 and 15 is provided at the table 5. The table 5 includes a top board 51 and a plurality of legs 52. The top board 51 has a circular hole.

The structure of the light ray controller 1 and its fabricating method are the same as the structure of the light ray controller 1 and its fabricating method according to the reference mode.

As shown in FIG. 14, the light ray controller 1 is fitted in the circular hole of the top broad 51 such that a large diameter bottom opening faces upward. Viewers 10 present around the table 5 can observe the internal surface of the light ray controller 1 diagonally from above the top board 51 of the table 5.

A rotation module 6 is provided under the table 5. The rotation module 6 includes a motor 61, a rotation shaft 62, a rotation base 63, a signal transmitter 64, and a rotation amount measuring device 65. The rotation shaft 62 is attached to the motor 61 so as to extend in the vertical direction and be positioned on a straight line common to the axis Z of the light ray controller 1. The rotation base 63 is mounted to the rotation shaft 62 in a horizontal attitude. The signal transmitter 64 is provided between the rotation shaft 62 and the rotation base 63. The signal transmitter 64 is a device for transmitting electric power or signals between a stationary body and a rotary body. As the signal transmitter 64, for example a slip ring or an optical rotary joint may be used.

The rotation shaft 62 is provided with the rotation amount measuring device 65. The rotation amount measuring device 65 is used to detect the rotational position of the rotation shaft 62. As the rotation amount measuring device 65, for example a rotary encoder may be used. The motor 61 is controlled by the controller 3.

A plurality of projectors 2 are fixed on the rotation base 63. According to the embodiment, the plurality of scanning projectors 2 are arranged at equiangular intervals on the circumference around the axis Z of the light ray controller 1. Note that the plurality of scanning projectors 2 do not have to be provided at equiangular intervals. Note however in order to stabilize the rotation of the scanning projectors 2 and facilitate control of the scanning projectors 2, the plurality of scanning projectors 2 are preferably provided at equiangular intervals as in the present embodiment.

The plurality of scanning projectors 2 are provided to direct a light ray to the external surface of the light ray controller 1 diagonally from under the light ray controller 1.

The plurality of scanning projectors 2 and the rotation amount measuring device 65 on the rotation base 63 are connected to the controller 3 through the signal transmitter 64.

When the motor 61 operates, the rotation shaft 62 rotates together with the rotation base 63 and the plurality of scanning projectors 2.

The rotation speed of the rotation base 63 is preferably at least five rotations per second for six scanning projectors 2 as in the example in FIG. 15, at least 15 rotations per second for two scanning projectors 2, at least ten rotations per second for three scanning projectors 2, and at least 7.5 rotations per second for four scanning projectors 2. When the number of scanning projectors 2 is one, the rotation speed of the rotation base 63 is preferably at least 30 rotations per second. More specifically, when the number of scanning projectors 2 is n (n is a natural number), the rotation speed of the rotation base 63 is preferably at least 30/n rotations per second.

Note that similarly to the above-described reference mode, a transparent circular plate may be fitted into the circular hole of the table 51.

Each scanning projector 2 can emit a light ray and swing the light ray in a horizontal plane and in a vertical plane. In this way, each scanning projector 2 can scan the external surface of the light ray controller 1 with the light ray. The operation of the scanning projectors 2 is the same as that of the scanning projectors 2 in the above described reference mode.

Note that according to the embodiment, although the scanning projectors 2 are used as a light ray generator, the invention is not limited to the same. Similarly to the above described reference mode, a general projector including a spatial light modulator such as a DMD, an LCOS and an LCD and a projecting system including a lens array composed of a plurality of lenses may be used as the light ray generator. In this case, when the apertures of the projecting system are sufficiently small, a group of light rays can be formed similarly to the scanning projectors 2.

The storage 4 is for example made of a hard disk, a memory card or the like. The storage 4 stores three-dimensional shape data used for presenting a three-dimensional image 300. The controller 3 is composed of for example a personal computer. The controller 3 controls the plurality of scanning projectors 2 based on the three-dimensional shape data stored in the storage 4. In this way, the three-dimensional image 300 is presented above the light ray controller 1.

The plurality of cameras 8 are arranged to pick up images of the faces of viewers 10 present around the table 5 similarly to the reference mode in FIGS. 1 and 2. Image data obtained by the plurality of cameras 8 is provided to the controller 3. The controller 3 calculates the eye positions (viewpoints) of the viewers 10 based on the image data provided from the plurality of cameras 8 and makes correction of a light ray group by eye tracking.

(2-2) Method of Presenting Three-Dimensional Image 300

Figure 16:
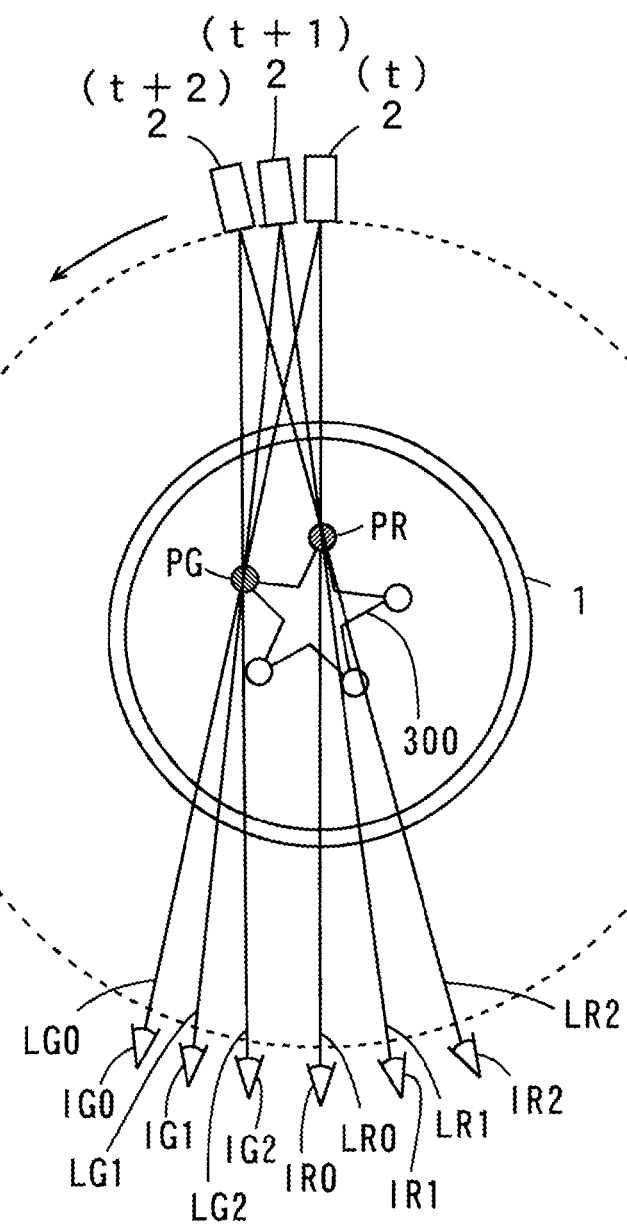
FIG. 16 is a schematic plan view for illustrating a method of three-dimensional image.

FIG. 16 is a schematic plan view for illustrating a method of presenting a three-dimensional image 300. FIG. 16 shows a single scanning projector 2.

The scanning projector 2 moves in the direction denoted by the arrow. For example, when a red pixel is presented in a position PR above the light ray controller 1, a red light ray LR0 is emitted in a direction passing through the position PR from the scanning projector 2 at time t, a red light ray LR1 is emitted in a direction passing through the position PR from the scanning projector 2 at time t+1, and a red light ray LR2 is emitted in a direction passing through the position PR from the scanning projector 2 at time t+2.

Thus, a red pixel to be a point light source is presented at a crossing point of the red light rays LR0, LR1, and LR2. In this case, when the eyes of a viewer are in the positions IR0, IR1 and IR2, a red pixel is observed in the position PR.

Similarly, when a green pixel is presented in a position PG above the light ray controller 1, a green light ray LG0 is emitted in a direction passing through the position PG from the scanning projector 2 at time t, a green light ray LG1 is emitted in a direction passing through the position PG from the scanning projector 2 at time t+1, and a green light ray LG2 is emitted in a direction passing through the position PG from the scanning projector 2 at time t+2.

Thus, a green pixel to be a point light source is presented at a crossing point of the green light rays LG0, LG1, and LG2. In this case, when the eyes of the viewer are in the position IG0, IG1, and IG2, a green pixel is observed in the position PG.

In this way, each light ray in a color to be presented is emitted in a direction passing through each position of the three-dimensional image 300 from different positions by each scanning projector 2.

A light ray group emitted from each of the rotating scanning projectors 2 is controlled at small angular intervals, so that the inner space of the light ray controller 1 is filled with crossing points with sufficient density. In this way, appropriate light rays passing through the positions PR and PG come into eyes when the inside of the light ray controller 1 is observed from any direction on the circumference, and human eyes perceive the point light sources as if the point light source is present there. Since human perceives illuminating light reflected or diffused at the surface of a real object as an object, the surface of the object can be regarded as a collection of point light sources. More specifically, colors in the positions PR and PG desired to be the surface of the object are appropriately reproduced by light rays emitted from the rotating projectors 2, so that the three-dimensional image 300 can be presented.

In this way, the three-dimensional image 300 can be presented in a space inside and above the light ray controller 1. In this case, viewers can visually recognize the same three-dimensional image 300 in different positions in the circumferential direction from different directions.

In the three-dimensional display according to the embodiment, a light ray emitted from the scanning projector 2 is diffused in the vertical direction at a diffusion angle α by the light ray controller 1 as shown in FIG. 11. In this way, a viewer can see a light ray in the same color emitted from the scanning projector 2 in different positions in the vertical direction within the range of the diffusion angle α.

The color of each of light rays emitted from the scanning projectors 2 in FIG. 14 is calculated for each rotational position of each of the scanning projectors 2 by the controller 3 based on the three-dimensional shape data stored in the storage 4. Here, the rotational position of the scanning projector 2 refers to the rotation angle of the scanning projector 2 from a reference radial direction around the axis Z.

More specifically, the controller 3 finds a crossing point between a surface of a stereoscopic shape pre-defined as three-dimensional shape data and each light ray, and calculates an appropriate color to be applied to the light ray.

The controller 3 determines the rotational position of each scanning projector 2 based on an output signal from the rotation amount measuring device 65 and controls each scanning projector 2 based on the color of each light ray in a light ray group calculated for each rotational position. Thus, a light ray in calculated colors is emitted from each scanning projector 2 such that the three-dimensional image 300 is presented above the light ray controller 1.

In this case, the controller 3 may previously calculate the color of each light ray to be emitted from each scanning projector 2 as color data based on the three-dimensional shape data and may store the calculated color data in the storage 4. Then, at the time of presenting the three-dimensional image 300, the color data may be read out from the storage 4 in synchronization with an output signal from the rotation amount measuring device 65 and each scanning projector 2 may be controlled based on the read out color data. Alternatively, the controller 3 may calculate the color of each light ray to be emitted from each scanning projector 2 as color data based on the three-dimensional shape data in synchronization with an output signal from the rotation amount measuring device 65 while the scanning projector 2 rotates and may control each scanning projector 2 based on the calculated color data.

As in the foregoing, in the three-dimensional display according to the embodiment, directional display of the three-dimensional image 300 can be performed.

Also in the three-dimensional display according to the embodiment, binocular parallax is caused based on the principle described in conjunction with FIG. 12.

(2-3) Function of Correcting Light Ray Group by Eye Tracking

In the three-dimensional display according to the embodiment of the present invention, a circular region in which the eyes of a plurality of viewers 10 present is set as a circular viewing area 500 similarly to the three-dimensional display according to the reference mode shown in FIGS. 1 and 2.

The controller 3 controls each scanning projector 2 with the assumption that the eyes of the viewers 10 are in the circular viewing area 500. In this way, when the eyes of the viewers 10 are in the circular viewing area 500, the viewers 10 can visually recognize the three-dimensional image 300 in the same shape and in the same height.

In the three-dimensional display according to the embodiment, a light ray group directed to the light ray controller 1 from each scanning projector 2 is corrected based on the eye positions of each viewer 10 detected by eye tracking. The method of correcting a light ray group according to the embodiment is the same as the method of correcting a light ray group described in conjunction with FIG. 13.

In the three-dimensional display according to the embodiment, a light ray group emitted from each scanning projector 2 is corrected depending on the eye positions of a viewer similarly to the three-dimensional display according to the reference mode, so that the three-dimensional image 300 can be presented with no deformation regardless of the eye positions of the viewer.

(2-4) Effects of First Embodiment

In the three-dimensional display according to the embodiment, the light ray controller 1 transmits a light ray directed by each scanning projector 2 without diffusing it in the circumferential direction. In this way, each of crossing points of light rays from the plurality of scanning projectors 2 become a point light source. A viewer perceives a collection of such point light sources virtually as a stereoscopic shape of a real object. At the time, since the line-of-sight direction of the left eye and the line-of-sight direction of the right eye crossing the same point light source are different, binocular parallax is caused. As a result, the three-dimensional image 300 is presented in a space inside and above the light ray controller 1 by the collection of a plurality of point light sources.

Here, when a viewer observes the internal surface of the light ray controller 1 from above the table 5, each of point light sources can be seen such that the point source is present at the same position when viewed from any position in the same height around the table 5. Therefore, the viewer can view the three-dimensional image 300 presented above the light ray controller 1 in any position within 360° around. Therefore, a plurality of people can observe the three-dimensional image 300 by the naked eye from any positions without using any special device. The number of viewers is not limited either.

The light ray controller 1 transmits each light ray directed by scanning projectors 2 while diffusing it in the ridgeline direction. Thus, even if the height of viewpoints of a viewer moves up and down, the viewer can view the three-dimensional image 300. Therefore, the viewing locations of the viewer are not limited.

Furthermore, a device that obstructs tasks does not have to be provided in a space above the table 5. Therefore, a work space for tasks using the three-dimensional image 300 presented above the light ray controller 1 can be reliably obtained on the table 5.

A light ray group can be directed to the light ray controller 1 from a plurality of rotational positions as each scanning projector 2 rotates. Therefore, a continuous three-dimensional image 300 having no disconnected part in the circumferential direction can be presented above the light ray controller 1 using a reduced number of scanning projectors 2.

Furthermore, in the three-dimensional display according to the embodiment, a light ray group emitted from each scanning projector 2 is corrected depending on the eye positions of a viewer similarly to the three-dimensional display according to the reference mode, so that the three-dimensional display 300 can be presented with no deformation regardless of the eye positions of the viewer.

(3) Second Embodiment (3-1) Structure of Three-Dimensional Display

Figure 17:
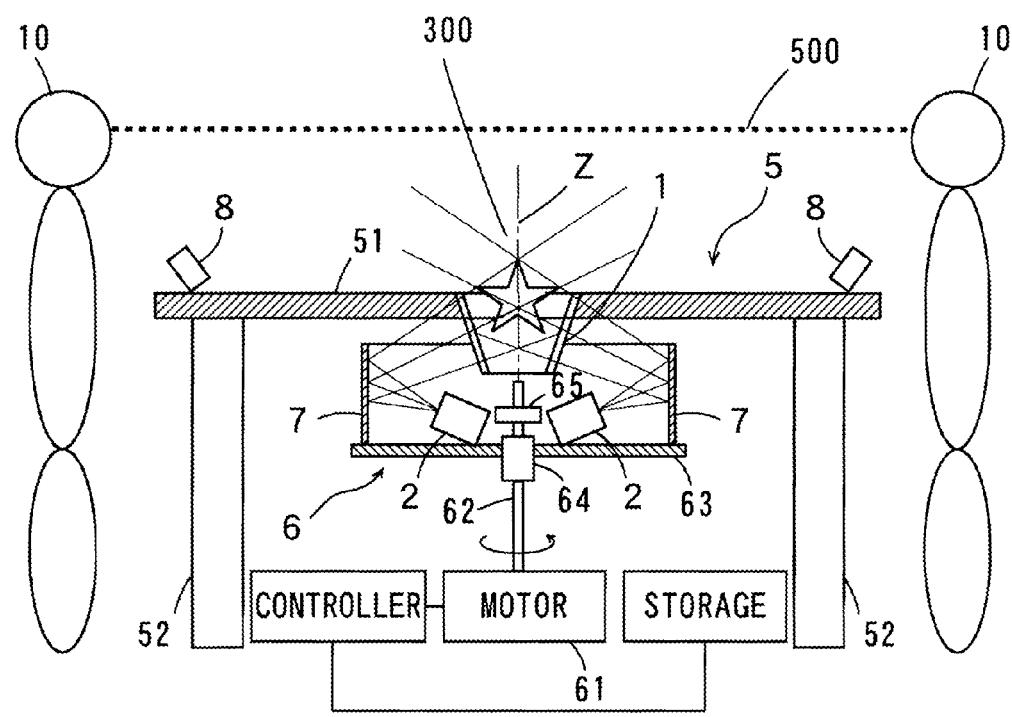
FIG. 17 is a schematic cross sectional view of a three-dimensional display according to a second embodiment of the invention.
Figure 18:
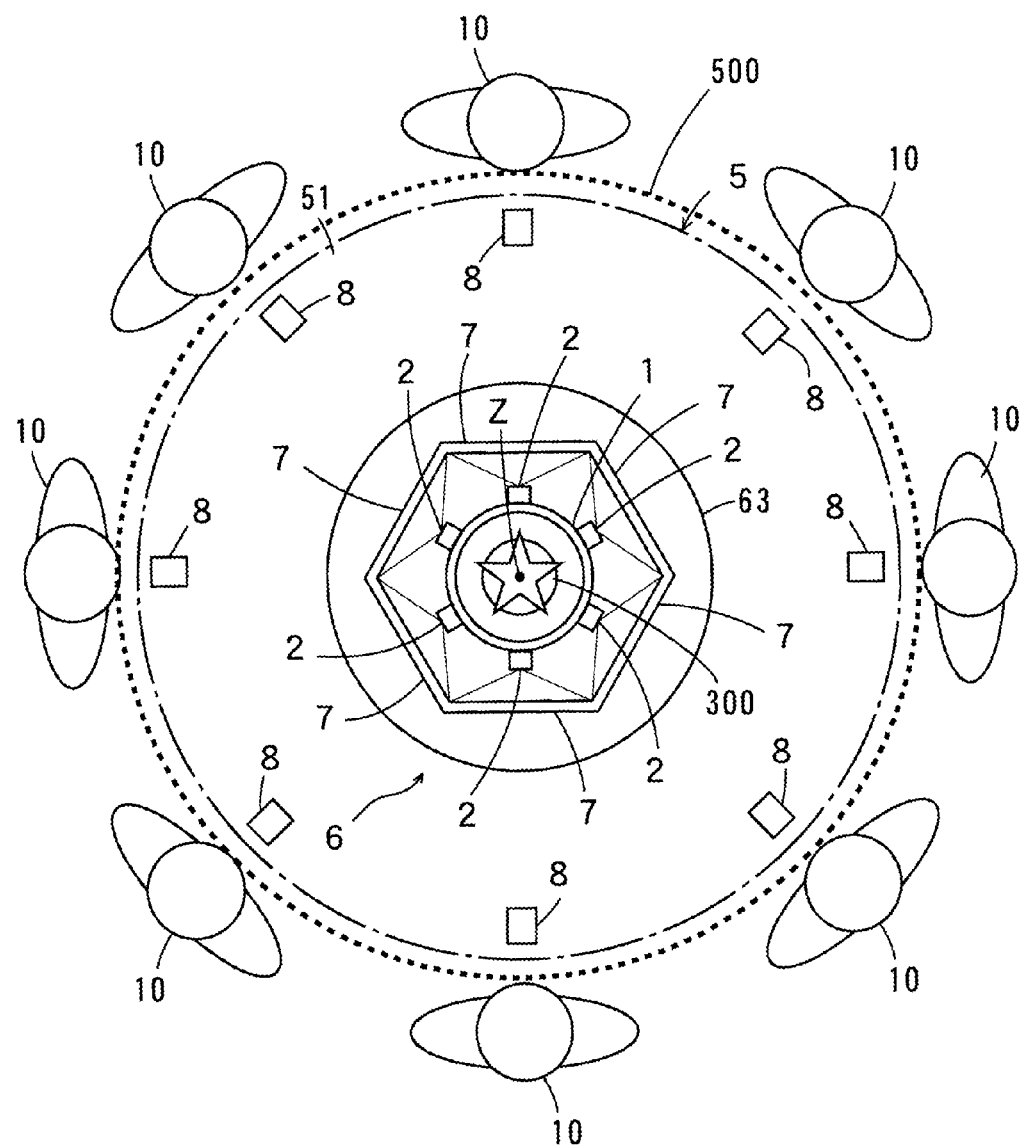
FIG. 18 is a schematic plan view of the three-dimensional display shown in FIG. 17.

FIG. 17 is a schematic cross sectional view of a three-dimensional display according to a second embodiment of the present invention. FIG. 18 is a schematic plan view of the three-dimensional display shown in FIG. 17.

The three-dimensional display in FIGS. 17 and 18 is different from the three-dimensional display in FIGS. 14 and 15 in the following points. The three-dimensional display in FIGS. 17 and 18 includes a plurality of mirrors 7 in addition to a light ray controller 1, a plurality of scanning projectors 2, a controller 3, a storage 4, a rotation module 6, and plurality of cameras 8.

The plurality of mirrors 7 are provided corresponding to the plurality of scanning projectors 2. The plurality of scanning projectors 2 are arranged in the vicinity of the rotation shaft 62 on the rotation base 63 at equiangular intervals on the circumference around the axis Z. The plurality of scanning projectors 2 are provided to direct a light ray group outward and obliquely upward.

The plurality of mirrors 7 are provided on the rotation base 63 such that light ray groups emitted from the plurality of scanning projectors 2 are reflected and directed to the external surface of the light ray controller 1 obliquely from under the light ray controller 1. In the example in FIG. 18, the plurality of mirrors 7 are arranged in a regular polygonal shape on the rotation base 63.

When the motor 61 operates, the rotation shaft 62 rotates together with the rotation base 63, the plurality of scanning projectors 2 and the mirrors 7. In this case, a light ray group emitted from each rotating scanning projector 2 is reflected by a corresponding mirror 7 and directed to the external surface of the light ray controller 1.

(3-2) Effects of Second Embodiment

In this way, since the plurality of scanning projectors 2 are provided in positions closer to the rotation shaft 62, the diameter of the rotation base 63 can be reduced. In this way, the plurality of scanning projectors 2 can be rotated at higher speed. As a result, the three-dimensional image 300 with higher resolution can be presented using a reduced number of scanning projectors 2.

(4) Other Embodiments (a) According to the above described reference mode and the first and second embodiments, the light ray controller 1 is fixed to the top board 51 of the table 5, but the light ray controller 1 may be rotated around the axis Z using a rotation driving device such as a motor. For example, when the light ray controller 1 is in an N-gonal frustum shape (N: an integer 3) or fabricated by joining a plurality of sheets, fluctuations in the optical performance are caused at the joints of the light ray controller 1. In such a case, the fluctuations in the optical performance at the joints are equalized by rotating the light ray controller 1 around the axis Z. As a result, variations of image quality in a presented three-dimensional image 300 can be prevented from being caused.

(b) The light ray controller 1 may have a columnar shape including a cylindrical shape, an elliptic cylinder, or N-gonal prism (N: an integer 3). Also in this case, the light ray controller 1 transmits a light ray while diffusing the ray in the vertical direction. In this way, a three-dimensional image can be presented so as to be positioned in a space above a reference plane such as an upper surface of the top board 51 of the table 5 or in a space inside the light ray controller 1.

(c) Although a plurality of scanning projectors 2 are provided at equiangular intervals on the rotation base 63 in the above mentioned first and second embodiments, a single scanning projector 2 may be provided on the rotation base 63. Also in this case, by rotating the rotation shaft 62 by the motor 61 at high speed together with the rotation base 63 and the scanning projector 2, a continuous three-dimensional image 300 with no disconnected part can be presented in a circumferential direction similarly to the case where the plurality of projectors 2 are used.

(d) Although the rotation amount measuring device 65 is provided to detect the rotational position of each scanning projector 2 in the above mentioned first and second embodiments, if the rotation base 63 rotates precisely at a fixed rotation speed, the rotation amount measuring device 65 has to be provided. In this case, the controller 3 can recognize the rotational position of each scanning projector 2 based on the rotation speed of the rotation base 63.

(e) Although the plurality of mirrors 7 are arranged in a polygonal shape on the rotation base 63 in the above mentioned second embodiment, a cylindrical mirror may be used. In this case, the cylindrical mirror may be fixed on the rotation stage 63 and rotate together with the rotation stage 63. Alternatively, the cylindrical mirror may be provided separately with the rotation base 63 and does not have to rotate.

(f) Although the plurality of cameras 8 are used to carry out eye tracking in the above mentioned reference mode and the first and second embodiments, the invention is not limited to the same. For example, the eye positions of a viewer may be detected by attaching a spatial position sensor at the head of the viewer. In this case, by picking up an image of the head of the viewer from the sides and the front while the spatial position sensor is attached at the head of the viewer, a vector from the stereoscopic sensor to the eyes of the viewer is measured in advance. Then, at the time of presenting a three-dimensional image 300, the eye positions of the viewer can be found based on the position and orientation of the spatial position sensor attached to the head and the previously measured vector. As the stereoscopic sensor, various sensors such as an optical sensor, a magnetic sensor, a ultrasonic sensor, a motion sensor and the like can be used.

A plurality of sensors may be used instead of the plurality of cameras 8. In this case, an object to be detected is mounted at a part of the body of a viewer and the object can be detected by the plurality of sensors to calculate the eye positions of the viewer.

(g) The three-dimensional displays according to the above mentioned reference mode and the first and second embodiments can be used for example in cases that require high shape accuracy for three-dimensional images such as in industrial or medical use.

In cases that do not require very high shape accuracy for three-dimensional images such as in entertainment or advertisement use, the three-dimensional display may not need the function of correcting light ray groups by eye tracking. In this case, the plurality of cameras 8 do not have to be provided.

(5) Correspondence Between Elements in Claims and Elements in Embodiments

Now, while how elements in the claims correspond to elements in the embodiments will be described by referring to examples, the invention is not limited to these examples.

In the above described embodiments, the light ray controller 1 is an example of a light ray controller, the scanning projector 2 is an example of a light ray generator, the rotation module 6 is an example of a rotation mechanism, the controller 3 is an example of control means, and the upper surface of the top board 51 of the table 5 is an example of reference plane. The annular lens 12, the annular prism 13 or the transparent member 14 are an example of a projecting portion, and the triangular sheet 16 or the sectorial sheet 18 is an example of a sheet member. The mirror 7 is an example of a reflector and the camera 8 is an example of detecting means.

For the elements in the claims, other various elements having the features or functions recited in the claims may also be used.

INDUSTRIAL APPLICABILITY

The present invention is applicable to use in cooperative work using three-dimensional images. The invention is also applicable to review work that a number of people proceed while sharing a single three-dimensional image as in an urban design planning scene. Furthermore, the invention is applicable when information of a three-dimensional image is shared in addition to such information as document spread over a table for example in a video meeting scene among remote places.

The invention is applicable in a case where a teacher makes explanation by pointing a part of a three-dimensional image in an educational scene or the like. Since a light ray controller is under the working plane such as a table and a three-dimensional image is presented in a space above the working plane, the invention is applicable in cases for obtaining a feeling of directly pointing the image rather than pointing the image from the outside through a glass case.

The invention is applicable to games using table type three-dimensional images. Since a pair of glasses is not necessary, the invention is applicable in a case where audiences come and go freely. The invention is also applicable in cases for making a theatrical space that can be observed from the surrounding area using a large arena type device.

The invention claimed is:

1. A three-dimensional display for presenting a three-dimensional image based on three-dimensional shape data, comprising:
   a light ray controller having a cone shape or a columnar shape and arranged such that a bottom of said cone shape or said columnar shape is opened on a reference plane;
   at least one light ray generator provided around said light ray controller so as to direct a light ray group including a plurality of light rays from under said reference plane and from the outside of said light ray controller to an external surface of said light ray controller;
   a rotating mechanism adapted to rotate said at least one light ray generator around a central axis of the light ray controller; and
   control means adapted to control said at least one light ray generator such that a three-dimensional image is presented by the light ray group generated by said at least one rotated light ray generator based on said three-dimensional shape data, wherein
said light ray controller is formed to transmit each light ray directed by said at least one light ray generator without diffusing the light ray in a circumferential direction and to transmit the light ray while diffusing the light ray in a ridgeline direction.

2. The three-dimensional display according to claim 1, wherein said reference plane is a top surface of a top board of a table, said top board has an opening, and said light ray controller is fitted in said opening of said top board.

3. The three-dimensional display according to claim 1, wherein said at least one light ray generator comprises a projector.

4. The three-dimensional display according to claim 1, wherein said light ray controller has projections formed so as to extend in said circumferential direction and to be arranged in said ridgeline direction on the external surface or an internal surface of said cone shape or said columnar shape.

5. The three-dimensional display according to claim 1, wherein said light ray controller is formed by a sheet material that transmits a light ray without diffusing the light ray in a first direction and transmits the light ray while diffusing the light ray in a second direction orthogonal to said first direction.

6. The three-dimensional display according to claim 1, wherein said control means controls the color of a light ray directed to said light ray controller by said at least one light ray generator for each emitting direction and for each rotational position of said at least one light ray generator.

7. The three-dimensional display according to claim 1, further comprising a reflector provided under said reference plane and outside said light ray controller, wherein
said at least one light ray generator is provided to emit a light ray group toward said reflector inside said reflector, and
said reflector is provided to reflect a light ray group emitted by said at least one light ray generator and direct the light ray group to the external surface of said light ray controller.

8. The three-dimensional display according to claim 1, wherein said at least one light ray generator comprises a plurality of light ray generators arranged at equiangular intervals around said light ray controller.

9. The three-dimensional display according to claim 1, further comprising detecting means for detecting eye positions of a viewer, wherein said control means controls said at least one light ray generator based on the eye positions detected by said detecting means.

10. The three-dimensional display according to claim 9, wherein said control means controls said at least one light ray generator such that the position of each pixel of a three-dimensional image perceived by a viewer is constant regardless of said eye positions of the viewer.

11. The three-dimensional display according to claim 10, wherein said control means controls said at least one light ray generator such that a reference three-dimensional image is presented when the eyes of said viewer are within a previously set viewing area and corrects the light ray group generated by said at least one light ray generator such that a three-dimensional image presented when the eyes of said viewer are positioned outside the previously set viewing area matches said reference three-dimensional display.

* * * * *